(12) United States Patent
Yamamoto et al.

(10) Patent No.: US 7,888,456 B2
(45) Date of Patent: Feb. 15, 2011

(54) PROCESS FOR PRODUCTION OF THERMOPLASTIC COPOLYMER

(75) Inventors: Daisuke Yamamoto, Nagoya (JP); Ken Sudo, Nagoya (JP); Hajime Takamura, Ichihara (JP); Taro Yamashita, Ichihara (JP); Koji Yamauchi, Nagoya (JP); Hideki Matsumoto, Nagoya (JP); Kenichi Utazaki, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 12/442,343

(22) PCT Filed: Sep. 13, 2007

(86) PCT No.: PCT/JP2007/067785
§ 371 (c)(1),
(2), (4) Date: May 11, 2009

(87) PCT Pub. No.: WO2008/035601
PCT Pub. Date: Mar. 27, 2008

(65) Prior Publication Data
US 2010/0087605 A1  Apr. 8, 2010

(30) Foreign Application Priority Data
Sep. 20, 2006  (JP) .............................. 2006-254967
Sep. 26, 2006  (JP) .............................. 2006-260391

(51) Int. Cl.
*C08F 6/00* (2006.01)
*C08G 63/02* (2006.01)

(52) U.S. Cl. ............................ 528/481; 526/64; 526/68; 526/266

(58) Field of Classification Search ................... 526/64, 526/68, 266; 528/481
See application file for complete search history.

(56) References Cited

FOREIGN PATENT DOCUMENTS

| JP | 62-41973 B2 |   | 9/1987 |
|----|-------------|---|--------|
| JP | 3-205407 A  |   | 9/1991 |
| JP | 2002-60424 A |  | 2/2002 |
| JP | 2003-313237 A | | 11/2003 |
| JP | 2004-315798 A | | 11/2004 |
| JP | 2004315796  | * | 11/2004 |
| JP | 2005-272821 | * | 10/2005 |
| JP | 2006-249202 A | | 9/2006 |

* cited by examiner

*Primary Examiner*—Terressa M Boykin
(74) *Attorney, Agent, or Firm*—Birch, Stewart, Kolasch & Birch, LLP

(57) ABSTRACT

A process for continuously producing a thermoplastic copolymer, in which a copolymer (A) containing unsaturated carboxylic acid alkyl ester units and unsaturated carboxylic acid units is produced and in succession heat-treated to perform intramolecular cyclization reaction by dehydration and/or dealcoholization reaction, for producing a thermoplastic copolymer (B) containing glutaric anhydride units and the unsaturated carboxylic acid alkyl ester units. The obtained copolymer is excellent in heat resistance and colorless transparency and very small in foreign matter content.

21 Claims, 5 Drawing Sheets

PROCESS FOR PRODUCTION OF THERMOPLASTIC COPOLYMER

TECHNICAL FIELD

This invention relates to a process for continuously producing a thermoplastic copolymer containing glutaric anhydride units excellent in heat resistance, molding property and colorless transparency and especially low in foreign matter content.

BACKGROUND ART

Amorphous resins such as polymethyl methacrylate (hereinafter referred to as "PMMA") and polycarbonate (hereinafter referred to as "PC") are used in extensive fields such as optical materials and various parts of household electric appliances, OA apparatuses and automobiles owing to their transparency and dimensional stability.

In recent years, these resins are widely used also especially for optical materials with higher performance such as optical lenses, prisms, mirrors, optical discs, optical fibers, liquid crystal display sheets and films, and light guide plates. These resins are required to have higher optical properties, moldability and heat resistance.

Further presently, these transparent resins are also used as illumination members of automobiles and the like such as tail lamps and head lamps. In recent years, for expanding the car interior space and reducing the gasoline consumption, there are such tendencies as to shorten the distances between light sources and tail lamp lenses, inner lenses and other various lenses of head lamps, shield beams and the like and also to thin parts. These resins are required to have excellent moldability. Furthermore, since motor vehicles are used in severe conditions, the resins are required to little change in shape at high temperature and humidity and also to be excellent in flaw resistance, weather resistance and oil resistance.

However, the PMMA resin has a problem of insufficient heat resistance, though it is excellent in transparency and weather resistance. On the other hand, the PC resin has such problems that since it is large in birefringence, namely, optical strain, the PC resin molding is optically anisotropic and that the resin is remarkably inferior in moldability, flaw resistance and oil resistance, though the resin is excellent in heat resistance and impact resistance.

So, for the purpose of improving the heat resistance of PMMA, resins containing a maleimide-based monomer, maleic anhydride monomer or the like as an ingredient for imparting heat resistance are developed. However, these resins have such problems that the maleimide-based monomer is expensive and low in reactivity and that maleic anhydride is low in thermal stability.

As methods for solving these problems, copolymers containing glutaric anhydride units obtained by heating a copolymer containing unsaturated carboxylic acid monomer units using an extruder for performing cyclization reaction are disclosed, for example, in Patent Documents 1 and 2. However, copolymers containing glutaric anhydride units obtained by heat-treating said copolymer by a suspension polymerization method or emulsion polymerization method have a problem that high colorless transparency cannot be obtained due to the foreign matter generated by the polymerization method.

Therefore, if bulk polymerization or solution polymerization not using a so-called polymerization aid such as a dispersing agent or emulsifying agent can be applied as a polymerization method for producing a precursor copolymer containing unsaturated carboxylic acid units, it can be expected that a copolymer with the excellent high colorless transparency required for optical materials can be obtained, and further a continuous polymerization process, if employed allows the copolymer composition and molecular weight distribution to be controlled. Thus, intensive studies have been made in this regard.

For example, processes comprising the steps of producing a copolymer containing unsaturated carboxylic acid alkyl ester units and unsaturated carboxylic acid units by bulk polymerization or solution polymerization, in succession, heating the obtained polymerization solution, for separating and removing the unreactive monomers and the unreactive monomers and the solvent, and further heating said copolymer for performing cyclization reaction are disclosed in Patent Documents 3 and 4 as methods for obtaining said copolymer containing glutaric anhydride units by a bulk polymerization or solution polymerization method.

However, though a polymerization method is described in the production process disclosed in Patent Document 3 (see Examples), the document does not particularly describes the devolatilization or cyclization of the obtained polymerization solution (see "Detailed Explanation of the Invention" and Examples). Further, there are such problems that in the case where said polymerization solution is heat-treated in the "high temperature vacuum chamber" described in the examples, a long-time heat treatment at a high temperature is required to consume enormous labor and energy for perfectly removing the unreactive monomers and the solvent in vacuum and for completing the cyclization reaction, and further that the obtained copolymer containing glutaric anhydride units is remarkably colored.

Furthermore, Patent Document 4 discloses a production process in which the copolymer solution (a) obtained by polymerization reaction is continuously supplied into a devolatilization tank for performing devolatilization and cyclization reaction. Also in this case, there are such problems that a long-time heat treatment at a high temperature is required to consume enormous labor and energy for perfectly removing the unreactive monomers and the solvent in vacuum and for completing the cyclization reaction, and further that the obtained copolymer containing glutaric anhydride units is remarkably colored.

Moreover, Patent Document 5 discloses a solution polymerization process for producing a copolymer containing unsaturated carboxylic acid alkyl ester units and unsaturated carboxylic acid units, but does not discuss the devolatilization or cyclization reaction using the polymerization solution.

In these situations, the present inventors proposed a process for producing a glutaric anhydride-containing copolymer excellent in colorless transparency and retention stability by producing a copolymer containing specific unsaturated carboxylic acid units under specific polymerization conditions and in succession heat-treating said copolymer, as described in Patent Document 6

This proposed technique could significantly improve the coloration and retention stability of the glutaric anhydride-containing copolymer obtained by performing continuous polymerization at a specific polymerization temperature. However, even the method of performing devolatilization and cyclization reaction using a double screw extruder disclosed in Patent Document 6 has a problem of low productivity since it is necessary to perform heat treatment at a high temperature for a long time by such methods as using an extruder with a very high ratio (L/D) of screw length to screw diameter and controlling the supplied amount of the copolymer for securing a retention time, in order to perfectly remove the unreactive monomers and the solvent in vacuum and to complete the cyclization reaction. At the same time, there is a problem that conspicuous coloration occurs due to the thermal decomposition of polymer chains caused by the heat generated by shearing in the case where the reaction mixture is retained in the double screw extruder for a long time.

That is, the resins that could be used for optical materials having higher performance such as optical lenses, prisms, mirrors, optical discs, optical fibers, liquid display sheets and films and light guide plates could not be produced by the production processes disclosed in Patent Documents 3 through 6. A process capable of industrially advantageously producing a copolymer containing glutaric anhydride units with higher colorless transparency and excellent thermal stability is desired.

[Patent Document 1] JP49-85184A (Pages 1-2, Examples)

[Patent Document 2] JP01-103612A (Pages 1-2, Examples)

[Patent Document 3] JP58-217501A (Pages 1-2, Examples)

[Patent Document 4] JP60-120707A (Pages 1-2, Examples)

[Patent Document 5] JP06-049131A (Pages 1-2, Examples)

[Patent Document 6] JP2004-002711A (Pages 1-2, Examples)

DISCLOSURE OF THE INVENTION

Problem to be Solved by the Invention

Therefore, the problem addressed by this invention is to provide a process for industrially advantageously producing a thermoplastic copolymer with molding properties of high heat resistance and excellent colorless transparency, low foreign matter content in the copolymer required for optical materials, lower remaining volatile component content and excellent thermal stability.

Means for Solving the Problem

The inventors made an intensive study to solve the above-mentioned problem, and as a result found that in the case where a copolymer containing unsaturated carboxylic acid units and unsaturated carboxylic acid ester units is produced as a precursor of a thermoplastic copolymer containing glutaric anhydride units, if bulk polymerization or solution polymerization performed under specific conditions is followed by devolatilization performed under specific conditions to separate and remove the unreactive monomers or the mixture consisting of the unreactive monomers and the polymerization solvent and further followed by intramolecular cyclization reaction performed under specific conditions, then it is possible to produce an economically superior glutaric anhydride-containing copolymer that has molding properties of excellent colorless transparency and thermal stability, and high quality to satisfy a low foreign matter content and allows easy separation of the unreactive monomers and polymerization solvent from the copolymer, though the production of such a copolymer could not have been achieved in the conventional findings. Thus, this invention has been arrived at.

That is, this invention provides:

[1] A process for producing a thermoplastic copolymer, in which a copolymer (A) containing (i) unsaturated carboxylic acid alkyl ester units and (ii) unsaturated carboxylic acid units is produced and in succession heat-treated to perform intramolecular cyclization reaction by (a) dehydration and/or (b) dealcoholization reaction, for producing a thermoplastic copolymer (B) containing (iii) glutaric anhydride units, each represented by the following general formula (1), and the (i) unsaturated carboxylic acid alkyl ester units, characterized in that a monomer mixture containing an unsaturated carboxylic acid alkyl ester monomer and an unsaturated carboxylic acid monomer as raw materials and a raw material mixture solution containing 0.1 to 2.0 parts by weight of a chain transfer agent per 100 parts by weight of the monomer mixture and a radical polymerization initiator with a half life of 0.01 to 60 minutes at the polymerization temperature are supplied into a polymerization vessel in a polymerization step, that continuous polymerization is performed while the content of the copolymer (A) in the polymerization vessel is kept at 20 to 80 wt %, to continuously produce a copolymer solution (a) consisting of the copolymer (A) and an unreactive monomer mixture, that in succession, the copolymer solution (a) obtained in the polymerization step is continuously supplied into a devolatilization apparatus, to perform devolatilization in a range from the polymerization temperature to lower than 300° C. at a reduced pressure of 200 Torr or less, to separate and remove the unreactive monomers (devolatilization step), and that in succession, the copolymer (A) obtained in said devolatilization step is continuously supplied into a cyclization apparatus, to be heat-treated in the cyclization apparatus at a temperature of 200° C. to 350° C., for performing intramolecular cyclization reaction (cyclization step).

[Chemical formula 1]

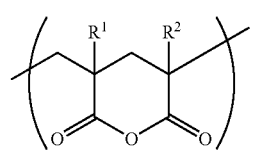

(1)

(where $R^1$ and $R^2$ denote, respectively independently, any one selected from a hydrogen atom and alkyl groups with 1 to 5 carbon atoms.)

[2] A process for producing a thermoplastic copolymer, according to said [1], wherein an organic solvent (C) capable of dissolving the copolymer (A) is contained in the raw material mixture by 1 to 200 parts by weight per 100 parts by weight of the monomer mixture in said polymerization step.

[3] A process for producing a thermoplastic resin, according to said [1] or said [2], wherein the polymerization vessel in said polymerization step is a completely mixing reactor.

[4] A process for producing a thermoplastic copolymer, wherein said polymerization step has the completely mixing reactor stated in said [3] and a tubular reactor with statically mixing structure portions disposed successively in series to said reactor; in said completely mixing reactor, continuous polymerization is performed with the content of the copolymer (A) kept at 20 to 55 wt %, to continuously produce the copolymer solution (a); in succession, the obtained copolymer solution (a) is continuously drawn by a pump and fed under pressurization to the tubular reactor with statically mixing structure portions; and further in succession in the tubular reactor with statically mixing structure portions, a radical polymerization initiator is added and mixed while the reaction solution is passed through, to produce the copolymer solution (a) while ensuring that the content of the copolymer (A) in the copolymer solution (a) can be kept at 50 to 90 wt % at the outlet of the tubular reactor with statically mixing structure portions.

[5] A process for producing a thermoplastic copolymer, according to any one of said [1] through [4], wherein the devolatilization apparatus in said devolatilization step is an apparatus that has a cylindrical container and a stirrer with numerous stirring elements installed around a singular or multiple rotating shafts, and has at least one or more vent holes at the top of the cylindrical portion, a supply port for supplying the copolymer solution (a) at one end of the cylindrical portion and a discharge port for taking out the copolymer (A) after completion of devolatilization at the other end.

[6] A process for producing a thermoplastic copolymer, according to said [5], wherein the devolatilization apparatus in said devolatilization step is a vented double screw extruder.

[7] A process for producing a thermoplastic copolymer, according to any one of said [1] through [6], wherein said devolatilization step comprises a former devolatilization substep for performing devolatilization in a devolatilization apparatus heated to a range from the polymerization temperature to 250° C. and reduced in pressure to 200 Torr or lower, and a subsequent latter devolatilization substep of performing devolatilization in a devolatilization apparatus heated to a range from the devolatilization temperature of said former devolatilization substep to 300° C. and reduced in pressure to 200 Torr or lower.

[8] A process for producing a thermoplastic copolymer, according to any one of said [1] through [7], wherein the cyclization apparatus in said cyclization step is a horizontal stirring apparatus that has a cylindrical container and a stirrer with multiple stirring elements installed around a rotating shaft, and has at least one vent hole at the top of the cylindrical portion, a supply port for supplying the copolymer (A) at one end of the cylindrical portion and a discharge port for taking out the thermoplastic copolymer (B) at the other end, for performing the cyclization reaction at a temperature of 250° C. to 350° C. and a pressure of 100 Torr or lower while the reaction mixture is retained for 20 to 180 minutes.

[9] A process for producing a thermoplastic copolymer, according to any one of said [1] through [8], wherein the unreactive monomers or the mixture consisting of the unreactive monomers and the organic solvent (C) separated and removed in the devolatilization step is recycled into said polymerization step.

[10] A process for producing a thermoplastic copolymer, according to any one of said [1] through [9], wherein provided is a volatile component recovery step for separating and refining the raw materials to be recovered for being recycled into the polymerization step, from the recovered solution obtained by recovering the unreactive monomers or the mixture consisting of the unreactive monomers and the organic solvent (C) separated and removed in said devolatilization step.

[11] A process for producing a thermoplastic copolymer, according to any one of said [1] through [10], wherein the added amount of the chain transfer agent is 0.5 to 1.5 parts by weight per 100 parts by weight of the monomer mixture in said polymerization step.

[12] A process for producing a thermoplastic copolymer, according to any one of said [1] through [11], wherein the added amount of the radical polymerization initiator is 0.001 to 2.0 parts by weight per 100 parts by weight of the monomer mixture in said polymerization step.

[13] A process for producing a thermoplastic copolymer, according to said [11] or [12], wherein the weight average molecular weight of said thermoplastic copolymer (B) is 30000 to 150000.

[14] A process for producing a thermoplastic copolymer, according to any one of said [1] through [13], wherein the monomer mixture in said polymerization step consists of 15 to 50 wt % of an unsaturated carboxylic acid, 50 to 85 wt % of an unsaturated carboxylic acid alkyl ester and 0 to 10 wt % of a further other copolymerizable monomer component with the total of the monomer mixture as 100 wt %.

[15] A process for producing a thermoplastic copolymer, according to said [14], wherein said thermoplastic copolymer (B) contains 5 to 50 wt % of (iii) glutaric anhydride units.

[16] A process for producing a thermoplastic resin composition obtained by further mixing a rubber-containing polymer (D) with the thermoplastic copolymer obtained by any one process of said [1] through [15].

[17] A process for producing a thermoplastic resin composition, according to said [16], wherein the rubber-containing polymer (D) is a multilayer structure polymer having one or more rubber layers inside.

[18] A process for producing a thermoplastic resin composition, according to said [17], wherein the number average particle size of the multilayer structure polymer is 0.05 to 1 μm.

[19] A process for producing a thermoplastic resin composition, according to said [17] or [18], wherein the polymer constituting the outermost shell layer of the multilayer structure polymer contains glutaric anhydride-containing units, each presented by said general formula (1).

[20] A process for producing a thermoplastic resin composition, according to any one of said [17] through [19], wherein the polymer constituting the rubbery layer of the multilayer structure polymer contains acrylic acid alkyl ester units and aromatic vinyl units.

Effects of the Invention

This invention allows industrially advantageous production of a thermoplastic copolymer with molding properties of high heat resistance and excellent colorless transparency, low foreign matter content in the copolymer required for optical materials, lower remaining volatile component content and excellent thermal stability.

MEANINGS OF SYMBOLS

1: polymerization vessel
2: devolatilization apparatus
2-1: devolatilization apparatus of former devolatilization sub-step
2-1: devolatilization apparatus of latter devolatilization sub-step
3: cyclization apparatus
4: cooling apparatus
5: refining apparatus
6: thermoplastic copolymer (B)

THE BEST MODES FOR CARRYING OUT THE INVENTION

The process for producing a thermoplastic copolymer (B) of this invention is explained below concretely.

The thermoplastic copolymer (B) of this invention refers to a thermoplastic copolymer containing (iii) glutaric anhydride units, each represented by the following general formula (1), and (i) unsaturated carboxylic acid alkyl ester units. Any one of such thermoplastic copolymers can be used alone or two or more of them can also be used together.

[Chemical formula 1]

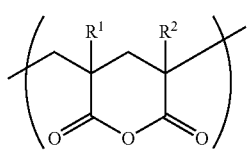

(1)

(where $R^1$ and $R^2$ denote, respectively independently, any one selected from a hydrogen atom and alkyl groups with 1 to 5 carbon atoms.)

The process of this invention for producing a thermoplastic copolymer containing glutaric anhydride units, each represented by said general formula (1), comprises basically the following three steps. That is, the production process comprises a step in which an unsaturated carboxylic acid alkyl ester monomer and an unsaturated carboxylic acid monomer capable of imparting said (iii) glutaric anhydride units, each represented by the general formula (1), in a later heating step are copolymerized with each other and further with a vinyl-based monomer capable of imparting other vinyl-based monomer units if they are to be contained, to produce a copolymer solution (a) containing a copolymer (A) (polymerization step), a subsequent step in which said copolymer solution (a) is continuously supplied by a pump into a devolatilization apparatus and heated under reduced pressure to continuously separate and remove the unreactive monomers (devolatilization step), and a further step in which the copolymer (A) obtained in said devolatilization step is heat-treated to perform intramolecular cyclization reaction by (a) dehydration and/or (b) dealcoholization for production (cyclization step). In this case, typically, if the copolymer (A) is heated, the carboxyl groups of two (ii) unsaturated carboxylic acid units are dehydrated or an alcohol is desorbed from a (ii) unsaturated carboxylic acid unit and a (i) unsaturated carboxylic acid alkyl ester unit adjacent to each other, to produce one said glutaric anhydride unit.

Figure 1:
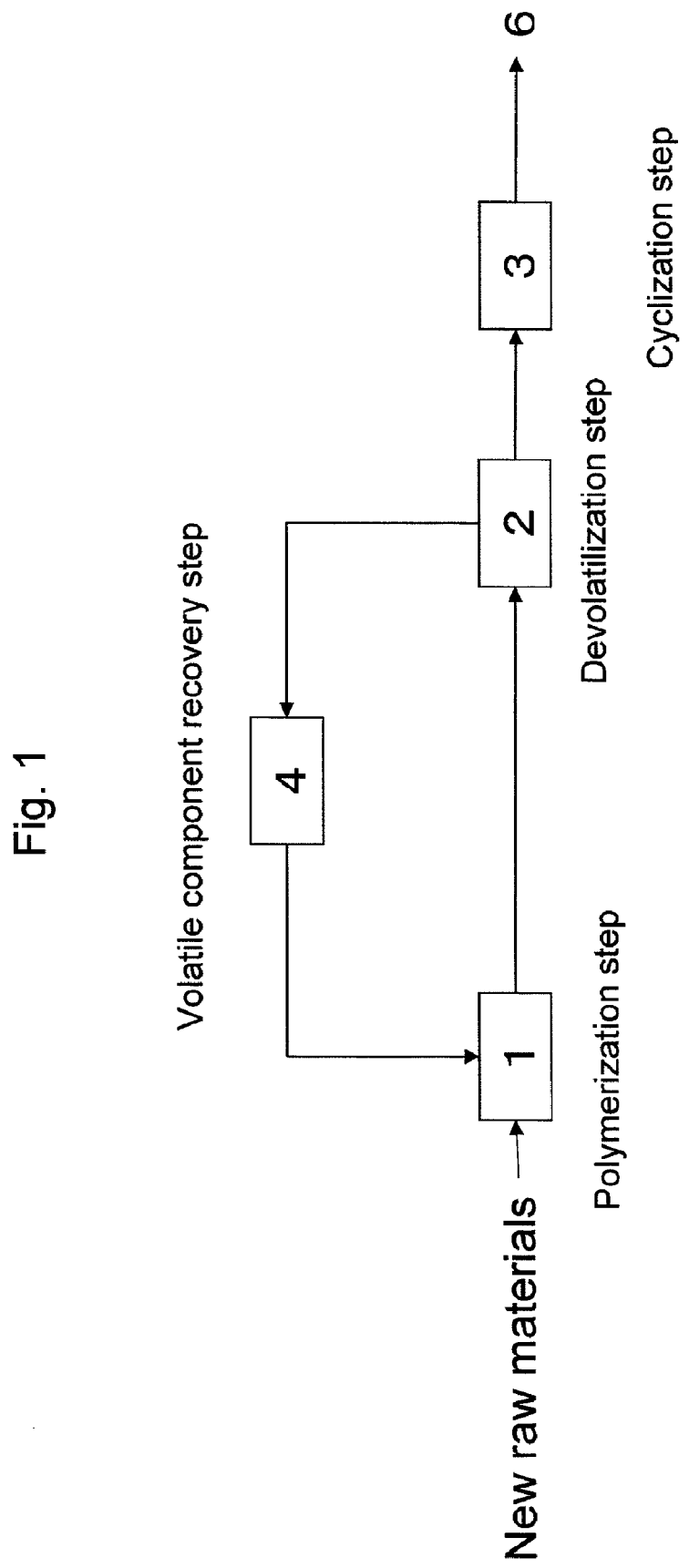
FIG. 1 is a schematic process chart showing an example of the process for producing a thermoplastic copolymer of this invention.

Further, the process for producing the thermoplastic copolymer (B) of this invention is characterized in that said polymerization step, devolatilization step and cyclization step are connected to perform continuous production. FIG. 1 is a schematic process chart showing an example of the production process of this invention. As shown in FIG. 1, the copolymer solution (a) obtained by performing polymerization reaction in a polymerization vessel (1) is continuously supplied into a devolatilization apparatus (2), and the unreactive monomers or the mixture consisting of the unreactive monomers and the organic solvent (C) (hereinafter may be referred to as the volatile component) is removed by devolatilization, to obtain a copolymer (A). In succession, the copolymer (A) as molten is continuously supplied into a cyclization apparatus (3), to perform cyclization reaction, for continuously producing a thermoplastic copolymer (B) containing glutaric anhydride units.

On the other hand, in the case where the copolymer solution (a) obtained in the polymerization step is continuously supplied into a devolatilization tank, to perform devolatilization and cyclization reaction as disclosed in Patent Document 3, devolatilization and cyclization reaction are insufficient. Therefore, thermal stability is low and the resin is colored, not allowing high colorless transparency to be obtained, hence not allowing the object of this invention to be achieved. Further, also in the case where a publicly known double screw extruder is used to perform devolatilization and cyclization reaction as disclosed in Example 17 of Patent Document 6, it is necessary for completing devolatilization and cyclization that an extruder with a very high L/D ratio of screw length to screw diameter and is used and that a very small amount of a copolymer is supplied (scarce supply) for adjusting the retention time, to thereby lower the productivity. In addition, since the heat generation by shearing generally becomes large if a double screw extruder is used for melt kneading, the long-time retention in said double screw extruder causes polymer chains to be thermally decomposed, thereby causing coloration, not allowing the object of this invention to be achieved.

Furthermore, it is preferred that the production process of this invention comprises, in addition to the "polymerization step," "devolatilization step" and "cyclization step," a "volatile component recovery step" of recovering, separating and refining the unreactive monomers or the mixture consisting of the unreactive monomers and the organic solvent (C) separated and removed in the devolatilization step, as recovered raw materials to be recycled into the polymerization step. As a particular method, as shown in FIG. 1, the unreactive monomers or the mixture consisting of the unreactive monomers and the organic solvent (C) separated and removed in the devolatilization apparatus (2) is supplied into a condensation apparatus (4) as recovered raw materials.

In this connection, in the production process of this invention, the devolatilization step and the cyclization step are carried out as separate steps. Therefore, in the case where the unreactive monomers or the mixture consisting of the unreactive monomers and the organic solvent (C) (hereinafter may be referred to as "the volatile component") is recycled into the polymerization step, the ingress of the water and/or methanol produced as byproducts in the cyclization reaction into the volatile component can be significantly decreased, and in said volatile component recovery step, the volatile component can be easily recovered.

The respective steps are concretely explained below.

[Polymerization Step]

The unsaturated carboxylic acid monomer used in the polymerization step is not especially limited, and any unsaturated carboxylic acid monomer capable of being copolymerized with another vinyl compound can be used. Preferred unsaturated carboxylic acid monomers include the compounds represented by the following general formula (2)

[Chemical formula 2]

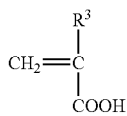

(where $R^3$ denotes any one selected from hydrogen and alkyl groups with 1 to 5 carbon atoms), maleic acid, hydrolysis product of maleic anhydride, etc. Especially in view of excellent thermal stability, acrylic acid and methacrylic acid are preferred. Methacrylic acid is more preferred. Any one of them can be used or two or more of them can also be used. Meanwhile, if the unsaturated carboxylic acid monomer represented by said general formula (2) is copolymerized, unsaturated carboxylic acid units, each with a structure represented by the following general formula (3), are given.

[Chemical formula 3]

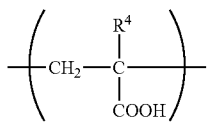

(where $R^4$ denotes at least one selected from hydrogen and alkyl groups with 1 to 5 carbon atoms.)

Further, the unsaturated carboxylic acid alkyl ester monomer is not especially limited, and as preferred examples of it, those represented by the following general formula (4) can be enumerated.

[Chemical formula 4]

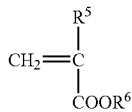

(where $R^5$ denotes any one selected from hydrogen and alkyl groups with 1 to 5 carbon atoms, and $R^6$ denotes any one selected from aliphatic hydrocarbon groups with 1 to 6 carbon atoms and alicyclic hydrocarbon groups with 3 to 6 carbon atoms, respectively non-substituted or substituted by a hydroxyl group or halogen.)

Among them, an acrylic acid ester and/or methacrylic acid ester having an aliphatic or alicyclic hydrocarbon group with 1 to 6 carbon atoms or said hydrocarbon groups having a substituent group is especially suitable. Meanwhile, if the unsaturated carboxylic acid alkyl ester monomer represented by said general formula (4) is copolymerized, unsaturated carboxylic acid alkyl ester units, each with a structure represented by the following general formula (5), are given.

[Chemical formula 5]

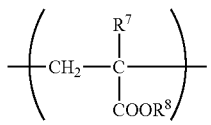

(where $R^7$ denote any one selected from hydrogen and alkyl groups with 1 to 5 carbon atoms, and $R^8$ denotes any one selected from aliphatic hydrocarbon groups with 1 to 6 carbon atoms and alicyclic hydrocarbon groups with 3 to 6 carbon atoms, respectively non-substituted or substituted by a hydroxyl group or halogen.)

Preferred examples of the unsaturated carboxylic acid alkyl ester monomer include monomers such as methyl acrylate, ethyl acrylate, n-butyl acrylate, t-butyl acrylate, benzyl acrylate, 2-ethylhexyl acrylate, lauryl acrylate, dodecyl acrylate, methyl methacrylate, ethyl methacrylate, n-butyl methacrylate, t-butyl methacrylate, benzyl methacrylate, lauryl methacrylate, dodecyl methacrylate and trifluoroethyl methacrylate. Of these, methyl methacrylate and ethyl methacrylate, especially methyl methacrylate, are particularly preferred in view of their good optical properties and thermal stability. Any one of them can be used alone or two or more of them can also be used as a mixture.

Further, in the first step, any other vinyl-based monomer can also be used to such an extent that the effects of this invention are not impaired. Preferred examples of the other vinyl-based monomer include aromatic vinyl-based monomers such as styrene, a-methylstyrene, o-methylstyrene, p-methylstyrene, o-ethylstyrene, p-ethylstyrene and p-t-butylstyrene, and vinyl cyanide-based monomers such as acrylonitrile, methacrylonitrile and ethacrylonitrile. In view of transparency, birefringence and chemicals resistance, a monomer not containing an aromatic ring can be more preferably used. Any one of them can be used alone, or two or more can also be used.

In this invention, the polymerization step can employ a method in which polymerization is performed in a state containing said monomer mixture, polymerization initiator and chain transfer agent and not substantially containing a solvent (bulk polymerization method) or a method in which an organic solvent (C) capable of dissolving the copolymer (A) is further added (solution polymerization method). The reason is that if any of these polymerization methods is employed, a thermoplastic copolymer (B) with high colorless transparency that could not be achieved by the conventional techniques can be obtained.

The organic solvent (C) used in this invention is not especially limited, if it is an organic solvent capable of dissolving the copolymer (A) as described before. One or more selected from ketones, ethers, amides and alcohols can be preferably used. Examples of the organic solvent that can be used include publicly known solvents such as acetone, methyl ethyl ketone, methyl-n-butyl ketone, methyl isobutyl ketone, ethyl isobutyl ketone, diethyl ether, tetrahydrofuran, dioxane, dimethylformamide, diethylformamide, dimethylacetamide, diethylacetamide, N-methylpyrrolidone, methanol, ethanol, isopropanol, ethylene glycol, propylene glycol, 2-methoxy-2-propanol and tetraglyme. Especially methyl ethyl ketone, methanol, isopropanol, tetrahydrofuran and the like are preferred.

In the case where the organic solvent (C) is added, it is preferred that the added amount is 1 to 200 parts by weight per 100 parts by weight of the monomer mixture in view of stability of polymerization reaction, recoverability in the devolatilization step and the recyclability into the polymerization step. A more preferred range is 20 to 150 parts by weight, and a further more preferred range is 50 to 150 parts by weight. Further, as far as the polymerization reaction can be sufficiently controlled, a bulk polymerization method not substantially containing the organic solvent can also be preferably used.

It is not preferred that the added amount of the organic solvent (C) is more than 200 parts by weight since the removal of the solvent in the subsequent devolatilization and cyclization steps becomes insufficient to increase the amount of the gas generated from the thermoplastic copolymer (B), thus lowering thermal stability. On the other hand, it is not preferred that the remaining solvent is decreased for decreasing the amount of gas generation, since long-time treatment at a high temperature is necessary in the devolatilization and cyclization steps, to remarkably color the thermoplastic copolymer (B).

In this invention, it is preferred that the dissolved oxygen concentration of the monomer mixture in the polymerization step is controlled to be 5 ppm or less, since the excellent colorless transparency, retention stability and thermal stability of the thermoplastic copolymer (B) can be achieved after completion of heat treatment. For further inhibiting the coloration after completion of heat treatment, a preferred dissolved oxygen concentration range is 0.01 to 3 ppm, and a more preferred range is 0.01 to 1 ppm. In the case where the dissolved oxygen concentration is more than 5 ppm, the thermoplastic copolymer (B) tends to be colored after completion of heat treatment and declines in thermal stability, not allowing the object of this invention to be achieved. In this invention, the dissolved oxygen concentration is the value measured using a dissolved oxygen meter (for example, DO Meter B-505 as a galvanic oxygen sensor produced by Iijima Denshi Kogyo K.K.). Methods for keeping the dissolved oxygen concentration at 5 ppm or less include a method of passing an inert gas such as nitrogen, argon or helium through the polymerization vessel, a method of bubbling an inert gas directly in the polymerization solution, a method of performing, once or twice or more, the operation of pressure-filling the polymerization vessel with an inert gas before initiation of polymerization and subsequently releasing the pressure, a method of deaerating the interior of a sealed polymerization vessel before supplying the monomer mixture and subsequently filling with an inert gas, and a method of passing an inert gas through the polymerization vessel.

With regard to the preferred chemical composition of the monomer mixture used in the polymerization step, with the amount of said monomer mixture as 100 wt %, it is preferred that the monomer mixture consists of 15 to 50 wt %, more preferably 20 to 45 wt % of an unsaturated carboxylic acid monomer and 50 to 85 wt %, more preferably 55 to 80 wt % of an unsaturated carboxylic acid alkyl ester monomer. In the case where a further other vinyl-based monomer copolymerizable with them is used, it is preferred that the amount of the vinyl-based monomer is 0 to 35 wt %. An especially preferred range is 0 to 10 wt %.

In the case where the amount of the unsaturated carboxylic acid monomer is less than 15 wt %, the production of the glutaric anhydride units, each represented by said general formula (1), by the heating of the copolymer (A) decreases, and the effect of enhancing heat resistance tends to be small. On the other hand, in the case where the amount of the unsaturated carboxylic acid monomer is more than 50 wt %, a large amount of unsaturated carboxylic acid units tends to remain after completion of the cyclization reaction by the heating of the copolymer (A), and the colorless transparency and retention stability tend to decline.

As the polymerization initiator used in this invention, it is important to use a radical polymerization initiator with a half life of 0.1 to 60 minutes at said polymerization temperature. A more preferred range is 1 to 30 minutes, and the most preferred range is 2 to 20 minutes. In the case where the half life is shorter than 0.1 minute, since the radical polymerization initiator is decomposed before it is uniformly dispersed in the polymerization reactor, the efficiency (initiation efficiency) of the radical polymerization initiator declines. If the amount of the radical polymerization initiator is increased, the thermal stability of the finally obtained thermoplastic copolymer declines. On the other hand, in the case where the half life is longer than 60 minutes, polymer lumps (scaling) are produced in the polymerization vessel, making it difficult to stably operate the polymerization, and further since the unreactive radical polymerization initiator remains in the copolymer solution (a) still after completion of polymerization, the remaining radical polymerization initiator, for example, colors the resin in the subsequent devolatilization or cyclization step and during molding, not allowing the high colorless transparency to be obtained. In either case, the object of this invention cannot be achieved.

Meanwhile, as "the half life values of the radical polymerization initiators" in this invention, the values stated in publicly known product catalogues of NOF Corporation, Wako Pure Chemical Industries, Ltd. and the like are employed.

The radical polymerization initiator can be selected, for example, from organic peroxides such as tert-butyl peroxy-3,5,5-trimethylhexanoate, tert-butyl peroxy laurate, tert-butyl peroxy isopropyl monocarbonate, tert-hexyl peroxy isopropyl monocarbonate, tert-butyl peroxy acetate, 1,1-bis(tert-butyl peroxy)3,3,5-trimethylcyclohexane, 1,1-bis(tert-butyl peroxy)cyclohexane, tert-butyl peroxy 2-ethylhexanoate, tert-butyl peroxy isobutyrate, tert-hexyl peroxy 2-ethylhexanoate, di-tert-butyl peroxide, 2,5-dimethyl-2,5-bis(tert-butyl peroxy)hexane, lauroyl peroxide, benzoyl peroxide, t-butyl peroxy neodecanoate, t-butyl peroxy pivalate, t-butyl peroxy-2-ethylhexanoate, t-butyl peroxy benzoate and dicumyl peroxide, azo compounds such as 2-(carbamoylazo)-isobutyronitrile, 1,1'-azobis(1-cyclohexanecarbonitrile), 2,2'-azobisisobutyronitrile, 2,2'-azobis(2-methylbutyronitrile), dimethyl 2,2'-azobisisobutyrate, 2,2'-azobis(2,4,4-trimethylpentane), 2,2'-azobis(2-methylpropane), 2,2'-azobis-4-methoxy-2,4-dimethylvaleronitrile and 2,2'-azobis-2,4-dimethylvaleronitrile, and the like, considering the polymerization temperature.

Further, the amount of the radical polymerization initiator used is decided in relation with the polymerization temperature, polymerization time (average retention time) and intended polymerization percentage. It is preferred that the amount is 0.001 to 2.0 parts by weight per 100 parts by weight of the monomer mixture. A more preferred range is 0.01 to 2.0 parts by weight, and a further more preferred range is 0.01 to 1.0 parts by weight.

Furthermore, in this invention, for the purpose of controlling the molecular weight, it is necessary to add 0.1 to 2.0 parts by weight of a chain transfer agent such as alkyl mercaptan, carbon tetrachloride, carbon tetrabromide, dimethylacetamide, dimethylformamide or triethylamine per 100 parts by weight of the monomer mixture. Examples of the alkyl mercaptan used in this invention include n-octyl mercaptan, t-dodecyl mercaptan, n-dodecyl mercaptan, n-tetradecyl mercaptan, n-octadecyl mercaptan, etc. Among them, t-dodecyl mercaptan and n-dodecyl mercaptan can be preferably used.

If said chain transfer agent is used for polymerization with its amount kept in the range of this invention, the weight average molecular weight (hereinafter also referred to as "Mw") of the copolymer (A) can be controlled in a range from 30000 to 150000, preferably 50000 to 150000, more preferably 50000 to 130000. Meanwhile, the weight average molecular weight in this invention means the weight average molecular weight as the absolute molecular weight measured by gel permeation chromatography with multi-angle light scattering (GPC-MALLS).

A copolymer with Mw of 30000 or higher is preferred, since the thermoplastic copolymer is not fragile and has good mechanical properties. Further, a copolymer with Mw of 150000 or lower is preferred for such a reason that defects of fisheyes and cissing do not occur since a material with a high molecular weight not sufficiently molten or dissolved in the melt-molded or solution-coated product does not remain as a foreign matter.

Further, in this invention, the inventors found that if a bulk polymerization method or solution polymerization method is selected for the polymerization step, the polymerization reaction takes place in a substantially uniformly mixed state, and that a copolymer with a homogeneous molecular weight distribution can be obtained. Therefore, in a preferred mode, the copolymer (A) obtained can have a molecular weight distribution (weight average molecular weight Mw/number average molecular weight Mn) of 1.5 to 3.0. In a more preferred mode, the copolymer (A) obtained can have a molecular weight distribution in a range from 1.5 to 2.5. In the case where the molecular weight distribution is in said range, the thermoplastic copolymer (B) obtained tends to be excellent in moldability and can be preferably used. Meanwhile, the molecular weight distribution (Mw/Mn) in this invention refers to the value calculated from the weight average molecular weight (Mw) and the number average molecular weight (Mn) respectively measured as absolute molecular weights by gel permeation chromatography with multi-angle light scattering (GPC-MALLS).

The polymerization vessel (1) used in this invention is not especially limited, but in view of uniform mixing capability and the production of a homogeneous polymerization solution (a), preferred is "a completely mixing reactor" in which the composition, temperature and the like of the polymerization solution can be substantially kept equal by stirring action in the respective portions in the polymerization vessel. Further, a vessel type reactor equipped with a stirrer, in which said stirrer has stirring blades capable of keeping the solution in the vessel substantially completely mixed, is more preferred.

The shapes of the stirring blades can be those of publicly known stirring blades. For example, double helical blades, paddle blades, turbine blades, propeller blades, Brumagin blades, multi-stage blades, anchor blades, max blend blades, puddle blades, MIG blades, the full-zone blades and Logborn blades produced by Kobelco Eco-Solutions Co., Ltd. and the like can be preferably exemplified. Above all, double helical ribbon blades are more preferred since more highly completely mixing capability can be obtained. Furthermore, to enhance the stirring effect, it is preferred to install baffles in the polymerization vessel.

Moreover, since the polymerization reaction and the stirring generate heat, the polymerization temperature is controlled by heat removal or heating as the case may be. The temperature can be controlled by such methods as using a jacket or circulating a heating medium for heat transfer, heat removal or heating, or supplying a cooled or heated monomer mixture, etc.

Moreover, it is preferred that the polymerization temperature is kept in a range from 60 °C to 160 °C. If the polymerization temperature is controlled in said range, the phenomenon of accelerating the polymerization speed due to the gel effect can be inhibited, and the production of the dimer produced during polymerization at a high temperature can be inhibited. Therefore, a thermoplastic copolymer (B) with excellent thermal stability can be efficiently produced.

Further, the polymerization time is decided in relation with the intended polymerization percentage, polymerization temperature, the initiator used and the amount of the initiator, and a range from 1 to 7 hours is preferred. A more preferred range is 1 to 6 hours. If the time is kept in this range, the polymerization control can be stabilized, and a methacrylic resin composition with high quality can be produced. If the retention time is shorter than 1 hour, it is necessary to increase the amount of the radical polymerization initiator used, making it difficult to control the polymerization reaction. A preferred time is 2 hours or longer. If the time is longer than 7 hours, the productivity declines. A more preferred time is 6 hours or shorter.

In the case where the production process of this invention is said continuous polymerization method, the average retention time of the copolymer solution (a) in the polymerization vessel corresponding to the polymerization time is also decided likewise in relation with the intended polymerization percentage, polymerization time, the initiator used and the amount of the initiator, but a range from 1 to 7 hours is preferred. A more preferred range is 1 to 6 hours. If the average retention time is kept in this range, the polymerization control can be stabilized even in the continuous polymerization method, and a methacrylic resin composition with high quality can be produced.

Thus, by performing the polymerization reaction under the polymerization conditions of this invention, the polymer content in the obtained copolymer solution (a) can be controlled in a range from 20 to 80 mass %. In a more preferred mode, the polymer content can be controlled in a range from 30 to 80 mass %, and a more preferred range is 50 to 70 mass %. In this case, the polymer content is the value obtained by diluting the copolymer solution (a) with tetrahydrofuran, re-precipitating the diluted solution in n-hexane, drying the precipitate, to obtain the copolymer (a), measuring the weight of the copolymer (a), and calculating from the following formula.

$$\text{Polymer content (wt \%)} = \{(S0-A1)/S0\} \times 100$$

where the respective symbols denote the following values.

A1=Weight of the copolymer (A) after drying (g)

S0=Weight of the copolymer solution (a) (g)

It is not preferred that the polymer content is less than 20 wt % for such reasons that a long-time treatment at a high temperature is necessary for removing the volatile component in the subsequent devolatilization and cyclization steps and that the obtained thermoplastic copolymer (B) is colored and thermally deteriorated. On the other hand, it is not preferred either that the polymer content is more than 80%, since mixing and heat transfer cannot be performed sufficiently, not allowing the polymerization reaction to be performed stably. That is, if the polymer content in the copolymer solution (a) is controlled within the range of this invention, stable and economically advantageous production can be made.

Further, since the viscosity of the copolymer solution (a) obtained under the polymerization conditions of this invention is in a range from 0.1 to 100 Pa·s, the acceleration of polymerization reaction due to a higher viscosity, namely, the gel effect can be inhibited even if the polymerization percentage ($\phi$) is in a high range from 50 to 80%, and the polymerization can be stably performed. Furthermore, since the viscosity is kept in said range, the copolymer solution (a) can be easily supplied by a pump into the devolatilization apparatus of the devolatilization step. In this case, the viscosity of the copolymer solution (a) in this invention is the value obtained by measuring the copolymer solution (a) kept at 30° C. using an oscillational viscometer (VM-100A produced by CBC Materials K.K.), and the polymerization percentage ($\phi$) is the value calculated from the unreactive monomers determined by a gas chromatograph.

One polymerization vessel (reactor) can be used, and as required, two vessels can also be used in combination.

Furthermore, in the production process of this invention, the following method can also be preferably used. A tubular reactor having static mixing structure portions is disposed in series to said mixing reactor. In the mixing reactor, continuous polymerization is performed while the content of the copolymer (A) is kept at 20 to 55 wt %, to continuously produce the copolymer solution (a) (former polymerization substep), and in succession the obtained copolymer solution (a) is continuously drawn by a pump (solution feed substep), being fed under pressurization into the tubular reactor having statically mixing structure portions. Further in succession in the tubular reactor having statically mixing structure portions, a radical polymerization initiator is added and mixed while the reaction solution is passed, to produce the copolymer solution (a) for ensuring that the content of the copolymer (A) of the copolymer solution (a) becomes 50 to 90 wt % at the outlet of the tubular reactor having statically mixing structure portions (latter polymerization substep).

In this production method, it is preferred that the polymer content of the copolymer solution (a) obtained in the former polymerization substep is controlled in a range from 20 to 55 mass %. In a more preferred mode, the polymer content is 30 to 55 mass %. In this case, the polymer content is the value obtained by diluting the copolymer solution (a) with tetrahydrofuran, re-precipitating the diluted solution in n-hexane, drying the precipitate, to obtain the copolymer (a), measuring the weight of the copolymer (a), and calculating from the following formula.

Polymer content (wt %)={(S0−A1)/S0}×100 where the respective symbols denote the following values.

A1=Weight of the copolymer (A) after drying (g)

S0=Weight of the copolymer solution (a) (g)

It is not preferred that the polymer content is 20 wt % or less for such reasons that a long-time treatment at a high temperature is necessary for removing the volatile component in the subsequent devolatilization and cyclization steps and that the obtained thermoplastic copolymer (B) is colored and thermally deteriorated. On the other hand, it is not preferred either that the polymer content is 80% or more, since mixing and heat transfer cannot be performed sufficiently, not allowing the polymerization reaction to be performed stably.

Further, since the viscosity of the copolymer solution (a) obtained under the polymerization conditions of this invention is in a range from 0.1 to 100 Pa·s, the acceleration of polymerization reaction due to a higher viscosity, namely, the gel effect can be inhibited even if the polymerization percentage ($\phi$) is in a high range from 50 to 80%, and the polymerization can be stably performed. Furthermore, since the viscosity is kept in said range, the copolymer solution (a) can be easily supplied by a pump to the devolatilization apparatus of the devolatilization step. In this case, the viscosity of the copolymer solution (a) in this invention is the value obtained by measuring the copolymer solution (a) kept at 30° C. using an oscillational viscometer (VM-100A produced by CBC Materials K.K.), and the polymerization percentage ($\phi$) is the value calculated from the unreactive monomers determined by a gas chromatograph.

In succession, the copolymer solution (a) obtained in the former polymerization substep is successively continuously supplied into the tubular reactor having statically mixing structure portions (statically mixing elements) inside (hereinafter this tubular reactor may be merely called "the tubular reactor" in this invention), to perform further polymerization.

The method for supplying the copolymer solution (a) obtained in the former polymerization substep into the tubular reactor is not especially limited. For example, the operation of drawing the reaction solution from the completely mixing reactor to the tubular reactor having statically mixing structure portions can be preferably performed by a method of using a pump. As the liquid feed pump, a publicly known gear pump can be suitably used. If the reaction solution is drawn by a pump, the reaction solution can be stably fed into the next substep, and the pressure in the tubular reactor having statically mixing structure portions installed in succession can be raised to higher than the vapor pressure of the reaction solution.

It is necessary that the pressure in the tubular reactor of this invention is higher than the vapor pressure of the reaction solution. It is preferred that the pressure is in a range from 5 to 40 kg/cm$^2$G and higher than the vapor pressure of the reaction solution. If the pressure in the reactor is kept at higher than the vapor pressure of the reaction solution, the bubbling of the reaction solution can be inhibited, and the blocking by bubbling can be prevented.

If the tubular reactor is used in the polymerization step of this invention, polymerization can be further made to proceed in the tubular reactor having statically mixing structure portions for raising the final polymer content (polymerization percentage), and the burden of the volatile component removal step performed in succession can be reduced, to allow economically advantageous production. Moreover, in the case where polymerization is made to proceed further in the tubular reactor having statically mixing structure portions inside, since the polymerization percentage in the mixing reactor of the first substep can be kept low, the polymerization temperature of the mixing reactor can be kept low for enhancing the thermal deformation temperature and the thermal decomposition resistance of the polymer.

When the tubular reactor is used to further perform polymerization, it is important that the inner wall temperature of the tubular reactor is set at a temperature higher than the polymerization temperature of the completely mixing reactor of the first substep and lower than 250° C. In the case where the inner wall temperature is lower than the polymerization temperature of the completely mixing reactor of the first substep, since the viscosity becomes high on the wall surfaces of the reactor, the reactor causes blocking, not allowing long-time operation. Further, if the inner wall temperature of the reactor is higher than 250° C., heat transfer raises the temperature of the reaction solution. So, the radical polymerization initiator is quickly decomposed, and the polymerization percentage cannot be kept sufficiently high. It is preferred that the inner wall temperature is 200° C. or lower.

Further, it is preferred that as the temperature of the reaction solution is raised by the heat generation of polymerization, the inner wall temperature sequentially rising from the inlet of the reaction solution is set in two or more temperature regions in the tubular reactor. This allows the polymerization percentage to be raised effectively while inhibiting the production of the dimer and inhibiting the sudden decomposition of the radical polymerization initiator.

Furthermore, when the polymerization is further performed in the tubular reactor, it is preferred to add one or more radical polymerization initiators with a half life of 0.1 to 60 minutes at the inner wall temperature of the reactor. A more preferred range is 1 to 30 minutes, and the most preferred range is 2 to 20 minutes. It is not preferred that the half life is longer than 60 minutes for such reasons that the polymerization percentage becomes high in the portions where flowability is low along the wall surfaces of the reactor and that if this phenomenon takes place for a long time, the reactor causes blocking. On the other hand, it is not preferred that the half life is too short for such reasons that the radical polymerization initiator is decomposed quickly, not allowing the polymerization percentage to be raised sufficiently and that a copolymer poor in thermal stability tends to be produced while the reaction solution passes through the reactor, though the short half life does not inconvenience the operation. Therefore, it is preferred to use a radical polymerization initiator with a half life of 0.1 minute or longer.

Meanwhile, as "the half life values of the radical polymerization initiators" in this invention, the values stated in publicly known product catalogues of NOF Corporation, Wako Pure Chemical Industries, Ltd. and the like are employed.

The radical polymerization initiator can be selected, for example, from organic peroxides such as tert-butyl peroxy-3,5,5-trimethylhexanoate, tert-butyl peroxy laurate, tert-butyl peroxy isopropyl monocarbonate, tert-hexyl peroxy isopropyl monocarbonate, tert-butyl peroxy acetate, 1,1-bis(tert-butyl peroxy)3,3,5-trimethylcyclohexane, 1,1-bis(tert-butyl peroxy)cyclohexane, tert-butyl peroxy 2-ethylhexanoate, tert-butyl peroxy isobutyrate, tert-hexyl peroxy 2-ethylhexanoate, di-tert-butyl peroxide, 2,5-dimethyl-2,5-bis(tert-butyl peroxy)hexane, lauroyl peroxide, benzoyl peroxide, t-butyl peroxy neodecanoate, t-butyl peroxy pivalate, t-butyl peroxy-2-ethylhexanoate, t-butyl peroxy benzoate and dicumyl peroxide, azo compounds such as 2-(carbamoylazo)-isobutyronitrile, 1,1'-azobis(1-cyclohexanecarbonitrile), 2,2'-azobisisobutyronitrile, 2,2'-azobis(2-methylbutyronitrile), dimethyl 2,2'-azobisisobutyrate, 2,2'-azobis(2,4,4-trimethylpentane), 2,2'-azobis(2-methylpropane), 2,2'-azobis-4-methoxy-2,4-dimethylvaleronitrile and 2,2'-azobis-2,4-dimethylvaleronitrile, and the like, considering the polymerization temperature.

Further, the amount of the radical polymerization initiator used is decided in relation with the polymerization temperature, polymerization time (average retention time) and intended polymerization percentage. It is preferred that the amount is 0.001 to 2.0 parts by weight per 100 parts by weight of the monomer mixture. A more preferred range is 0.001 to 1.0 part by weight, and a further more preferred range is 0.001 to 0.5 part by weight.

In the production process using said tubular reactor, it is preferred that production is performed to ensure that the final polymerization percentage at the outlet of the tubular reactor is kept in a range from 50 to 85 wt %. If the final polymerization percentage is lower than 50 wt %, the production using one completely mixing reactor is more economically advantageous, and the effect of this invention cannot be exhibited. On the other hand, it is not preferred either that the final polymerization percentage is higher than 85 wt % for such a reason that since the flowability remarkably declines, stable transport becomes difficult. A preferred range is 55 to 85 wt %, and a more preferred range is 60 to 80 wt %.

A tubular reactor having statically mixing structure portions is a tubular reactor in which multiple mixing elements free from moving portions are fixed inside (tubular reactor having statically mixing elements). Since bulk polymerization or solution polymerization is performed continuously while static mixing is performed by the tubular reactor, continuous polymerization in a high polymer concentration region can be performed.

The multiple mixing elements fixed inside said tubular reactor are, for example, such elements that allow the polymerization solution flowing into the tube to be divided and changed in direction, to repeat division and joining, so that the polymerization solution can be mixed as a result. Examples of the tubular reactor include SMX type and SMR type Sulzer tubular mixers, Kenix static mixers, Toray tubular mixer, etc. Especially SMX type and SMR type Sulzer tubular mixers are preferred.

It is preferred that the average retention time of the reaction solution in the tubular reactor is kept in a range from 0.01 to 60 minutes. If the average passing time is shorter than 0.01 minute, the polymerization percentage cannot be sufficiently made high. On the other hand, it is not preferred that the average passing time is longer than 60 minutes for such reasons that the thermal stability of the finally obtained thermoplastic copolymer (B) declines and that productivity also declines.

As the method for adding the radical polymerization initiator used in this tubular reactor, preferred is a method of adding the radical polymerization initiator via a sideline installed together with the inlet of the tubular reactor, and also preferred is a method of preliminarily mixing the radical polymerization initiator in a static mixer disposed in series to the inlet of the tubular reactor and passing the mixture through said tubular reactor.

One of radical polymerization initiators can be used or two or more of them can also be used as a mixture. In the case where two or more radical polymerization initiators are used, it is preferred to use radical polymerization initiators different in 10-hour half life temperature by 5° C. or more. This allows the polymerization to proceed more efficiently.

Further, for adaptation to the temperature rise of the reaction solution, it is preferred to add the radical polymerization initiator at a place immediately before the reaction solution inlet of the tubular reactor and at one or more places inside the reactor. This allows the polymerization to proceed more effectively. In this case, it is preferred to select and add radical polymerization initiators in such a combination that the half life at the inner wall temperature of the reactor is 1000 seconds or shorter and that the 10-hour half life becomes sequentially longer from the inlet side.

It is preferred that the added amount of the radical polymerization initiators in this case is 0.0005 to 1.0 part by weight per 100 parts by weight of the monomer mixture. A more preferred range is 0.001 to 1.0 part by weight, and a further more preferred range is 0.001 to 0.5 part by weight.

In the production process using said tubular reactor, it is important to operate with the polymerization conditions kept in said ranges. If the abovementioned specific conditions are employed, continuous bulk polymerization or continuous solution polymerization can be performed stably with the polymer content kept in a range from 50 to 90 wt %, more preferably 60 to 90 wt %, further more preferably 60 to 85 wt %, and the copolymer solution (a) can be produced more efficiently.

[Devolatilization Step]

As a feature of this invention, it was found that if the copolymer solution (a) obtained by the polymerization step is continuously supplied into a devolatilization apparatus in the subsequent devolatilization step, to separate and remove the unreactive monomers or the mixture consisting of the unreactive monomers and the organic solvent (C), (a) dehydration and/or (b) dealcoholization takes place efficiently in the cyclization step described later, and that even in a bulk polymerization method or solution polymerization method, the unreactive monomers and polymerization solvent remaining in the obtained thermoplastic copolymer (B) are decreased to assure excellent thermal stability. Thus, this invention has been arrived at.

Further, since the devolatilization step and the cyclization step are separated and performed using different apparatuses, the unreactive monomers or the mixture consisting of the unreactive monomers and the organic solvent (C) separated and removed in the devolatilization step can be recovered separately from the water or methanol obtained as a byproduct in the cyclization step. Thus, the unreactive monomers or the mixture consisting of the unreactive monomers and the organic solvent (C) can be easily recovered and refined to allow recycled use in the polymerization step.

It is important that the devolatilization temperature in the devolatilization step is in a range from the polymerization temperature to lower than 300° C., preferably 150 to lower than 300° C. In the case where the temperature is the polymerization temperature or lower, since the devolatilization is insufficient, the unreactive monomers or the organic solvent (C) as the polymerization solvent cannot be sufficiently removed even in the next cyclization step, and as a result, the thermal stability of the obtained thermoplastic copolymer (B) declines. Further, in the case where the temperature is 300° C. or higher, the remaining unreactive monomers and the copolymer (A) as a precursor polymer are thermally deteriorated to color the obtained thermoplastic copolymer (B), thus lowering the colorless transparency.

Furthermore, it is important that the pressure in the devolatilization step is a reduced pressure of 200 Torr or lower. More preferred is 100 Torr or lower, and most preferred is 50 Torr or lower. The lower limit of the pressure is not especially limited, but substantially 0.1 Torr or higher.

In the case where the pressure in the devolatilization step is 200 Torr or higher, even if devolatilization is performed in said temperature range, the unreactive monomers or the mixture consisting of the unreactive monomers and the polymerization solvent cannot be separated or removed efficiently, and in this connection, the next cyclization reaction becomes insufficient, to lower the thermal stability of the obtained thermoplastic copolymer (B), not allowing the object of this invention to be achieved.

As the continuous devolatilization apparatus for performing such devolatilization, preferably used is an apparatus that has a cylindrical container and a stirrer having multiple stirring elements attached to a rotating shaft, and has at least one or more vent holes at the top of the cylindrical portion, a supply port for supplying the copolymer solution (a) at one end of the cylindrical portion and a discharge port for taking out the copolymer (A) after completion of devolatilization at the other end.

The number of rotating shafts is not limited but is usually 1 to 5, preferably 2 to 4, and an apparatus having two rotating shafts is more preferred.

Further, it is preferred that the number of stirring elements is 10 to 50. A more preferred range is 20 to 30. The shape of stirring elements is not especially limited, and can also be a multi-lobed shape (for example, the shape of clover leaves, etc.). The stirring elements may have holes or projections and recesses as desired, or may be shaped like ship screws or fan blades, and various applications are possible. Further, the stirring elements shaped like screws can be preferably used since the action of feeding the reaction mixture can be obtained.

Particularly, a vented continuous double screw kneading apparatus and batch type melt kneading apparatus are preferred, and a single screw extruder, double screw extruder, double screw/single screw combined continuous kneading extruder and triple screw extruder respectively with "Unimelt" type screw(s), and continuous or batch type kneading machine can be enumerated. Above all, especially a vented double screw extruder or a continuous double screw reactor with multiple convex lens type and/or elliptical plate paddles can be preferably used.

In the case where a double screw extruder or continuous double screw reactor is used for performing the cyclization reaction, it is preferred that the ratio (L/D) of the screw diameter (D) to the screw length (L) of the devolatilization apparatus is 40 or more to secure the heating time required for sufficiently performing the devolatilization. It is not preferred to use a devolatilization apparatus with short L/D for such reasons that the unreactive monomers or the mixture consisting of the unreactive monomers and the organic solvent (C) remains in a large amount, causing the reaction to take place again at the time of heat molding, therefore that the molded article tends to show silver blisters and bubbles and that the color tone tends to be conspicuously deteriorated during retention for molding.

Further, the devolatilization step in the production process of this invention can employ a method of using two or more devolatilization apparatuses disposed in series, to perform the devolatilization, and this is preferred since the remaining volatile component in the copolymer (A) obtained after devolatilization can be decreased.

In the case where multiple devolatilization apparatuses are used, the temperatures of the respective devolatilization apparatuses are not limited. For example, in the case where two devolatilization apparatuses disposed in series are used for performing devolatilization, it is preferred that the temperature of the devolatilization apparatus connected with the polymerization vessel is in a range from the polymerization temperature to 250° C. Further, it is preferred that the temperature of the devolatilization apparatus connected with the cyclization apparatus is 200° C. to 300° C.

Furthermore, in the case where multiple devolatilization apparatuses are used for devolatilization, for example, in the case where two devolatilization apparatuses disposed in series are used for devolatilization, it is preferred that the pressure of the devolatilization apparatus connected with the polymerization vessel is 760 Torr (normal pressure) to 500 Torr, and the pressure of the subsequent devolatilization apparatus connected with the cyclization apparatus is a reduced pressure of 200 Torr or lower, since the volatile component can be efficiently removed. Further, more preferred is 100 Torr or lower, and most preferred is 50 Torr or lower. The lower limit of the pressure is not especially limited but is substantially 0.1 Torr or higher.

Figure 2:
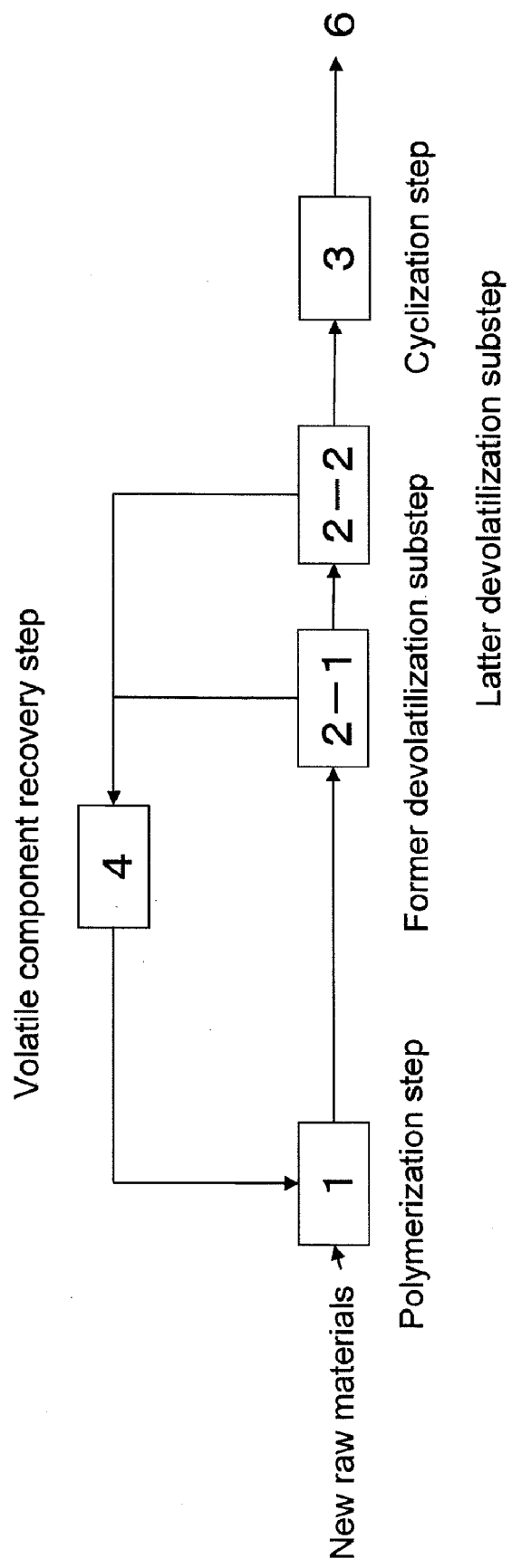
FIG. 2 is a schematic process chart showing another example of the process for producing a thermoplastic copolymer of this invention.

An example of devolatilization by using such multiple devolatilization apparatuses is explained in reference to the schematic process chart shown in FIG. 2. As shown in FIG. 2, in the devolatilization step, two devolatilization apparatuses are disposed in series. The devolatilization apparatus connected with the polymerization vessel (1) performs the former devolatilization substep, and the devolatilization apparatus connected with the cyclization apparatus performs the latter devolatilization substep. Particularly, the copolymer solution (a) obtained in the polymerization step is continuously supplied into the devolatilization apparatus (2-1) of the former devolatilization substep with the temperature raised into a range from the polymerization temperature to 250° C., to be devolatilized, and in succession, the copolymer (A)

obtained in the former devolatilization substep is continuously supplied into the devolatilization apparatus (2-2) of the latter devolatilization substep with the temperature raised into a range from 200° C. to 300° C., to be devolatilized in the latter devolatilization substep. Then, the obtained copolymer (A) is continuously supplied into the cyclization apparatus (3) of the cyclization step.

The copolymer (A) thus obtained via the devolatilization step contains 10 wt % or less of the remaining unreactive monomers or the remaining mixture consisting of the unreactive monomers and the polymerization solvent. In a preferred mode, the content can be kept at 5 wt % or less, and in the subsequent cyclization step, (a) dehydration and/or (b) dealcoholization can be efficiently performed. The lower limit content of the volatile component in the copolymer (A) after the devolatilization step is not especially limited but is substantially 0.1 wt % or more.

Further, after completion of the devolatilization step, the copolymer (A) can be introduced as a high temperature melt into the next cyclization step, and the cyclization reaction can be performed continuously with the copolymer as introduced. Therefore, the thermoplastic copolymer (B) can be economically advantageously produced.

[Cyclization Step]

To perform the cyclization process in this invention, namely, to heat the copolymer (A) for performing intramolecular cyclization reaction by (a) dehydration and/or (b) dealcoholization, in order to produce a thermoplastic copolymer containing glutaric anhydride units, it is important to use a continuous kneading extruder as the cyclization apparatus in a range from 200 to 350° C., preferably 250 to 330° C.

If the cyclization temperature is 200° C. or lower, the cyclization reaction is insufficient, and the thermal stability of the obtained thermoplastic copolymer (B) declines. Further, if the cyclization reaction is going to be completed at said temperature, a long time is taken to perform the cyclization reaction, and as a result, the resin is colored due to thermal deterioration. On the other hand, if the cyclization temperature is 350° C. or higher, the resin is colored due to thermal deterioration and high colorless transparency cannot be obtained. In the case where the cyclization temperature deviates from the abovementioned range, the object of this invention cannot be achieved in either case.

Further, in the production process of this invention, it is preferred that the pressure of the cyclization step is 100 Torr or lower, preferably 50 Torr or lower, more preferably 30 Torr or lower, most preferably 10 Torr or lower for such reasons that the cyclization can be made to proceed and that a thermoplastic copolymer (B) excellent in thermal stability and color tone can be produced. Furthermore, the lower limit of the pressure is not limited, but is usually about 0.1 Torr. If the pressure is controlled to 100 Torr or lower, the water and/or alcohol produced as a byproduct by the cyclization reaction can be efficiently removed.

On the other hand, it is not preferred that the pressure is 100 Torr or higher for such reasons that since the pressure reduction degree is insufficient, the cyclization reaction is insufficient, causing the thermal stability of the obtained thermoplastic copolymer (B) to decline, and in addition that owing to the oxygen existing in the system, the polymer is deteriorated during cyclization and tends to be colored. Further, it is not preferred either that the reaction is performed without pressure reduction in an inert gas atmosphere for such reasons that the water and/or alcohol produced as a byproduct during cyclization cannot be sufficiently removed and that the thermal stability of the obtained thermoplastic copolymer (B) declines.

Furthermore, in this invention, it is preferred that the heat treatment time in the cyclization step is 1 minute to 120 minutes. A more preferred range is 20 minutes to 120 minutes, and a further more preferred range is 30 minutes to 120 minutes. The most preferred range is 30 to 90 minutes. It is not preferred that the heat treatment time is 20 minutes or shorter for such reasons that the cyclization conversion is low, making it difficult to keep the composition of the obtained thermoplastic copolymer (B) within the range of this invention, further that since the unreactive unsaturated carboxylic acid units remain in a large amount, the reaction takes place again at the time of heat molding, causing the water and/or alcohol produced as a byproduct during the cyclization reaction to be evaporated to form radical silver blisters on the surface of the molded article, that bubbles are generated on the surface of the molded article to cause visual defects and that the thermal stability becomes low.

The cyclization apparatus used for the cyclization reaction is not especially limited, if the apparatus can continuously cyclize the copolymer supplied from the previous step of the devolatilization apparatus and can satisfy the abovementioned conditions of temperature, pressure and time. However, a horizontal stirring apparatus having a cylindrical container and a stirrer with multiple stirring elements attached to a rotating shaft and has at least one vent hole at the top of the cylindrical portion, a supply port for supplying the copolymer (A) at one end of the cylindrical portion and a discharge port for taking out the thermoplastic copolymer (B) at the other end can be preferably used.

In a more preferred mode, as the horizontal stirring apparatus, since the water/methanol produced as a byproduct in the cyclization reaction can be efficiently removed from the molten thermoplastic copolymer (A), it is possible to use a horizontal stirring apparatus having a container with a jacket for a heating medium around it, having one vent hole at least at the top of the container, a support port for supplying the copolymer (A) at one end of the container and a discharge port for taking out the thermoplastic copolymer (B) at the other end, further having at least two stirring shafts in the container and multiple scraping blades attached to said shafts, wherein the blades attached to the respective shafts are arranged in such a staggered manner that the blades attached to the respective shafts do not collide with each other when said shafts are rotated in the same direction or different directions, and that when the shafts are rotated, slight clearances are kept between the blade tips on the one hand and the inner surface of the container and the surface of the other stirring shaft on the other hand, or otherwise wherein the blades attached to the respective shafts are arranged on the same plane perpendicular to the shaft directions in such a manner that when the shafts are rotated, slight clearances are kept between the blade tips on the one hand and the inner surface of the container and the surfaces of the blades of the other shaft on the other hand, to thereby knead the molten copolymer (A) by letting the blades contact incessantly renewed surfaces of the molten copolymer, while performing the cyclization reaction. As particular examples of the horizontal stirring apparatus, the horizontal stirring apparatuses highly capable of renewing the surfaces of the molten polymer disclosed in JP58-11450B and JP61-52850B are suitable. Preferred examples include the spectacle-shaped blade polymerizer and lattice blade polymerizer produced by Hitachi, Ltd., SCR and NSCR reactors produced by Mitsubishi Heavy Industries, Ltd., KRC kneader and SC processor produced by Kurimoto Ltd., BIVOLAK produced by Sumitomo Heavy Industries, Ltd., etc.

[Volatile Component Recovery Step]

Further, in the process for producing the thermoplastic copolymer (B) of this invention, it is preferred that the unreactive monomers or the mixture consisting of the unreactive monomers and the organic solvent (C) separated and removed in the devolatilization step is recycled into said polymerization step. Furthermore, in this invention, it is preferred that the unreactive monomers or the mixture consisting of the unreactive monomers and the organic solvent (C) removed in said devolatilization step is recovered for being reused in the polymerization step.

Moreover, it is preferred that "a volatile component recovery step" for recovering, separating and refining the unreactive monomers or the mixture consisting of the unreactive monomers and the organic solvent (C) separated and removed in the devolatilization step, as recovered raw materials to be recycled into the polymerization step is provided in addition to the abovementioned "polymerization step," "devolatilization step" and "cyclization step."

The volatile component recovery step is explained below in more detail using the schematic process charts shown in FIGS. 1 and 2. Since the volatile component is vaporized in a state of reduced pressure and heating in the devolatilization apparatus (2), it is supplied from the devolatilization apparatus (2) to the condensing apparatus (4) and the volatile component is recovered as a liquid, being able to be recycled as it is again in the polymerization step. In this case, the method for supplying the volatile component containing the unreactive monomers or the mixture consisting of the unreactive monomers and the organic solvent (C) separated and removed in the devolatilization step into the condensing apparatus (4) is not especially limited, and a method of using an exhauster such as an ejector, blower or vacuum pump can be used. The condensing apparatus (4) is not especially limited, and a publicly known condenser, a distiller with a condenser or the like can be exemplified. The condensing apparatus cools and condenses the volatile component, and the recovered liquid is recycled into the polymerization vessel (1).

Figure 3:
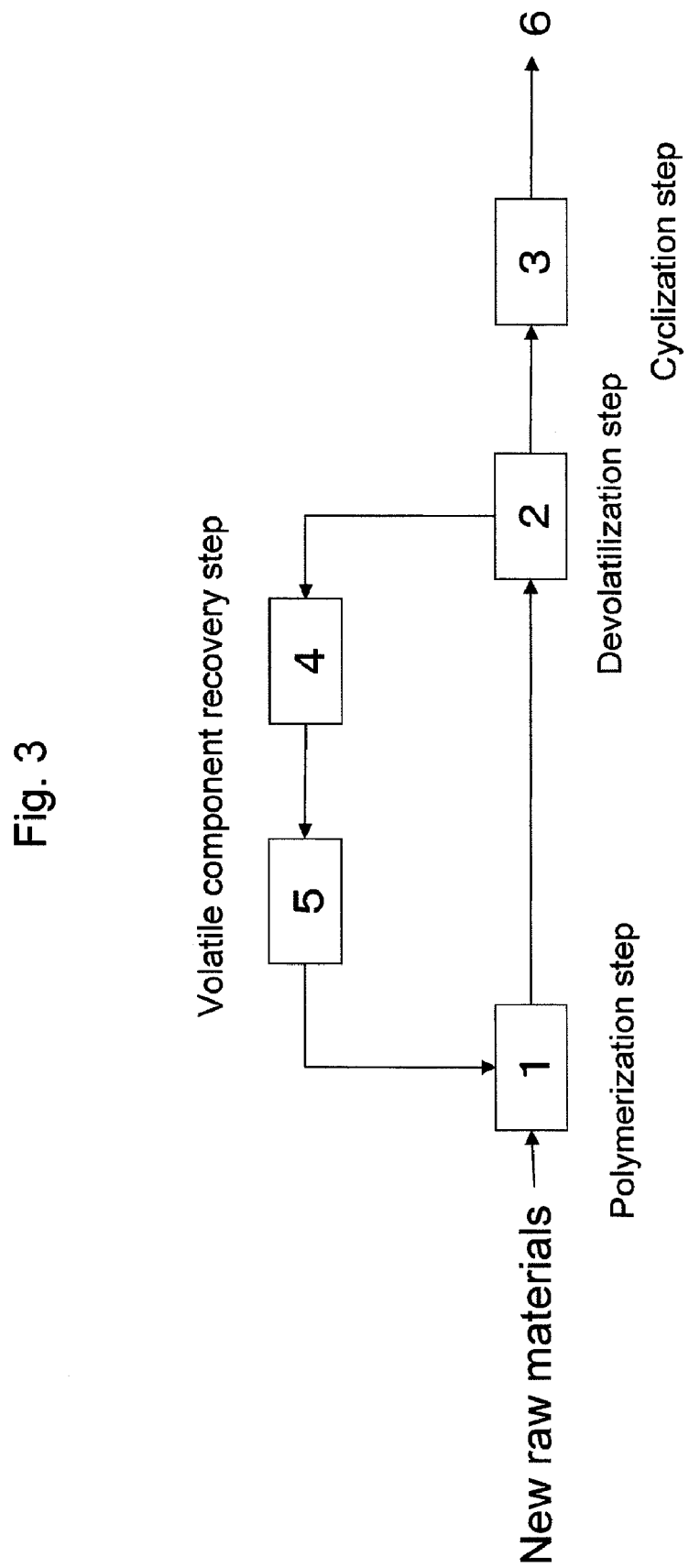
FIG. 3 is a schematic process chart showing a further other example of the process for producing a thermoplastic copolymer of this invention.
Figure 4:
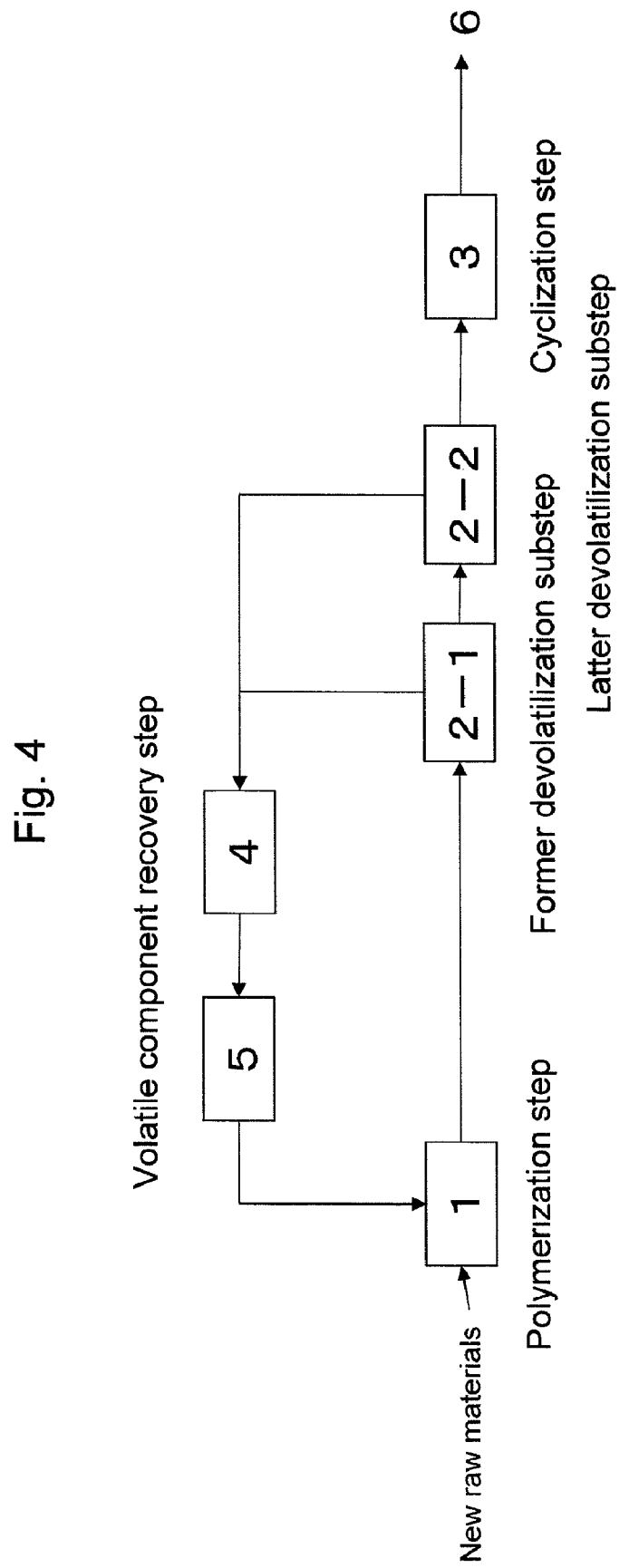
FIG. 4 is a schematic process chart showing still a further other example of the process for producing a thermoplastic copolymer of this invention.

Further, as shown in FIGS. 3 and 4, a method in which the recovered liquid obtained in the condensing apparatus (4) is supplied into a refining apparatus (5) such as a flash column, demister or distillation column, to be refined and separated, for being recycled into the polymerization vessel (1) can also be preferably used.

Figure 5:
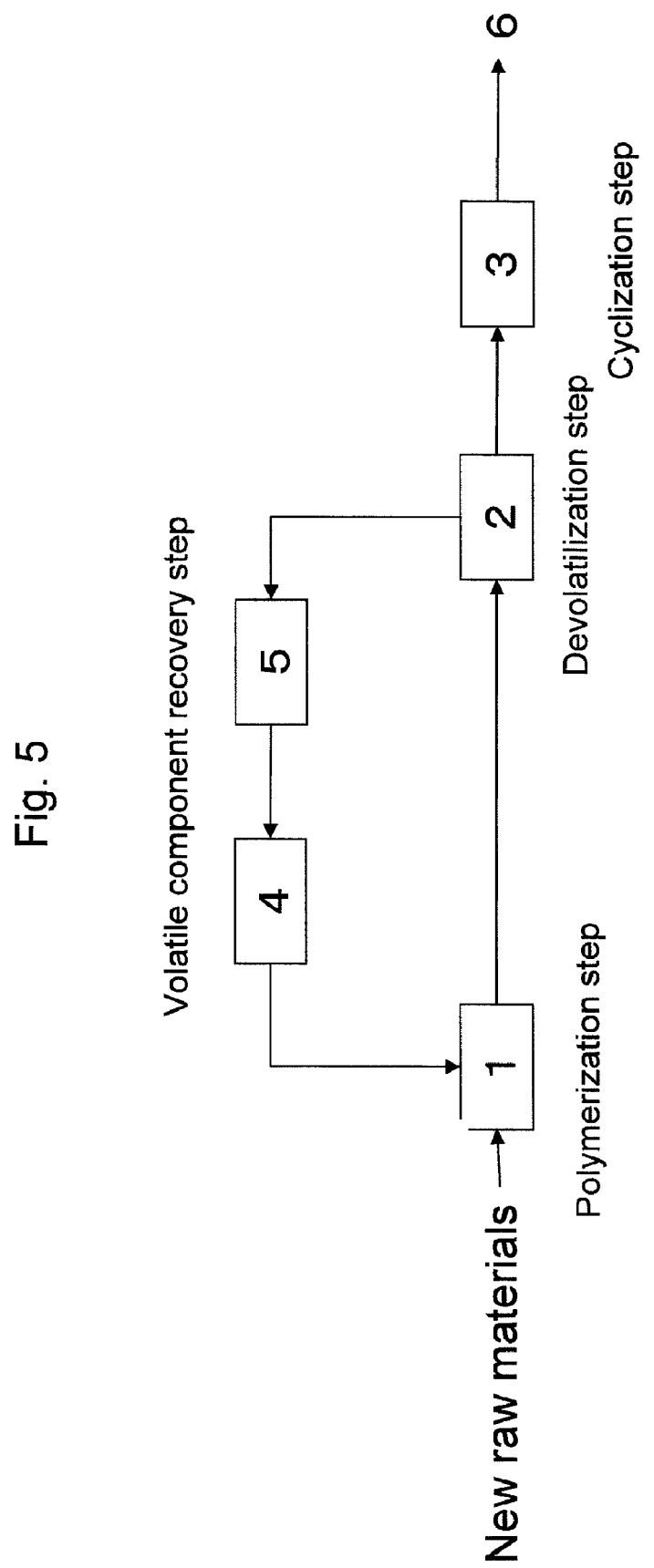
FIG. 5 is a schematic process chart showing still a further other example of the process for producing a thermoplastic copolymer of this invention.

Furthermore, as shown in FIG. 5, a method in which the volatile component separated and removed in the devolatilization apparatus (2) is supplied into the refining apparatus (5), without being condensed, to be refined and separated, supplied into the condensing apparatus (4), to be cooled and condensed for being recycled as recovered raw materials, can also be preferably used.

As described above, in the production process of this invention, if the volatile component separated and removed in the devolatilization step is recovered in the volatile component recovery step and recycled as recovered raw materials into the polymerization vessel (1), the thermoplastic copolymer (B) can be economically advantageously produced.

The content of the glutaric anhydride units represented by said general formula (1) in the thermoplastic copolymer (B) thus obtained is not especially limited. It is preferred that the content is 5 to 50 wt % per 100 wt % of the thermoplastic copolymer. A more preferred range is 10 to 50 wt %, and a further more preferred range is 25 to 50 wt %. An especially preferred range is 30 to 45 wt %.

Further, for determining the respective component units of the thermoplastic copolymer of this invention, in general, an infrared spectrophotometer or proton nuclear magnetic resonance ($^1$H-NMR) measuring instrument can be used. In infrared spectrometry, glutaric anhydride units are characteristic in the absorption at 1800 cm$^{-1}$ and 1760 cm$^{-1}$ and can be distinguished from unsaturated carboxylic acid units and unsaturated carboxylic acid alkyl ester units. Furthermore, in $^1$H-NMR method, for example, in the case of a copolymer consisting of glutaric anhydride units, methacrylic acid and methyl methacrylate, in the spectral assignment in deuterated dimethyl sulfoxide solvent, the peak of 0.5-1.5 ppm corresponds to the hydrogen of the α-methyl groups of methacrylic acid, methyl methacrylate and glutaric anhydride ring compound, the peak of 1.6-2.1 ppm, to the hydrogen of the methylene groups of the polymer main chain, the peak of 3.5 ppm, to the hydrogen of the carboxylic acid ester (—COOCH$_3$) of methyl methacrylate, and the peak of 12.4 ppm, to the hydrogen of the carboxylic acid of methacrylic acid. Thus, the copolymer composition can be decided from the integral ratio of the spectrum. Further, in addition to the above, in the case where styrene is contained as a further other copolymer component, the hydrogen of the aromatic ring of styrene can be seen at 6.5-7.5 ppm, and similarly, from the spectral ratio, the copolymer composition can be decided.

Moreover, the thermoplastic copolymer of this invention can contain unsaturated carboxylic acid units and/or copolymerizable other vinyl-based monomer units in addition to the abovementioned (i) and (ii) components.

In this invention, it is preferred that the (a) dehydration and/or (b) dealcoholization reaction of the copolymer (A) is performed sufficiently to keep the amount of the unsaturated carboxylic acid units contained in the thermoplastic copolymer at 10 wt % or less. That is, keeping in a range from 0 to 10 wt % is preferred. A more preferred range is 0 to 5 wt %. If the content of unsaturated carboxylic acid units is more than 10 wt %, colorless transparency and retention stability tend to decline.

Furthermore, it is preferred that the amount of the copolymerizable other vinyl-based monomer units is 0 to 35 wt %. More preferred is 10 wt % or less, that is, a more preferred range is 0 to 10 wt %, and a further more preferred range is 0 to 5 wt %. Especially in the case where aromatic vinyl-based monomer units such as styrene units are contained, if the content is too large, colorless transparency, optical isotropy and chemicals resistance tend to decline.

It is desirable that the weight average molecular weight (hereinafter may also be referred to as "Mw") of the thermoplastic copolymer (B) of this invention is 30000 to 150000. A preferred range is 50000 to 150000, and a more preferred range is 50000 to 130000. Meanwhile, the weight average molecular weight in this invention refers to a weight average molecular weight as an absolute molecular weight measured by gel permeation chromatography with multi-angle light scattering (CPC-MALLS).

Further, in this invention, it was found that if a bulk polymerization method or solution polymerization method is selected for the polymerization step, the polymerization reaction takes place in a substantially uniformly mixed state, to obtain a copolymer (A) with a homogeneous molecular weight distribution, and that, in this connection, in a preferred mode, a thermoplastic copolymer (B) with a molecular weight distribution (weight average molecular weight Mw/number average molecular weight Mn) of 1.5 to 3.0 can be obtained, and further that, in a more preferred mode, a thermoplastic copolymer (B) in a range from 1.5 to 2.5 can be obtained. In the case where the molecular weight distribution is in the abovementioned range, the obtained thermoplastic copolymer (B) tends to be excellent in moldability and can be preferably used. Meanwhile, the molecular weight distribution (Mw/Mn) in this invention is the value obtained by calculation from the weight average molecular weight (Mw) and the number average molecular weight (Mn) as absolute molecular weights measured by gel permeation chromatography with multi-angle light scattering (GPC-MALLS).

The thermoplastic copolymer (B) of this invention obtained as described above has excellent heat resistance of 120° C. or higher as the glass transition temperature and is preferred in view of practical heat resistance. Further, in a preferred mode, it has very excellent heat resistance of 130° C. or higher as glass transition temperature. Further, the upper limit is usually about 160° C. Meanwhile, the glass transition temperature in this case is the glass transition temperature measured at a heating rate of 20° C./min using a differential scanning calorimeter (DSC-7 produced by Perkin Elmer).

Meanwhile, in a preferred mode, the coloration of the thermoplastic copolymer (B) produced according to the production process of this invention is inhibited to 3 or less as the value of yellowness index. In a more preferred mode, the thermoplastic copolymer (B) has very high colorless transparency of 2 or less. In the above, the yellowness index value is the value obtained by measuring, according to JIS K 7103, the YI value of a 1 mm thick molded article obtained by injection molding at glass transition temperature+140 □C. The lower limit of the yellowness index is not especially limited and is usually about 1, though a lower value is preferred.

Further, the content of the remaining unreactive monomers or the remaining mixture consisting of the unreactive monomers and the polymerization solvent (hereinafter may be generally referred to as "the volatile component") in the thermoplastic copolymer (B) produced by the production process of this invention is reduced to 5 wt % or less. In a preferred mode, it is reduced to 3 wt % or less. Furthermore, the heating loss (hereinafter may be referred to as "the amount of gas generation") caused by heating at glass transition temperature+130° C. for 30 minutes is 1.0 wt % or less in a preferred mode. It is 0.5 wt % or less in a more preferred mode, and 0.3 wt % or less in the most preferred mode. In this case, high thermal stability that could not be achieved by conventional methods can be achieved. The lower limits of the content of the volatile component and the amount of gas generation are not especially limited but are usually about 0.1 wt %, though lower values are preferred.

Moreover, the thermoplastic copolymer (B) of this invention has high flowability of 100 to 10000 Pa·s as the melt viscosity measured at glass transition temperature+130° C. and a shear rate of 12/second in a preferred mode and therefore has excellent moldability. The melt viscosity in a more preferred mode is 100 to 5000 Pa·s, and that in the most preferred mode is 100 to 2000 Pa·s. Meanwhile, the melt viscosity in this case is the melt viscosity (Pa·s) measured at the abovementioned temperature and shear rate using Capilograph 1C (die diameter 1.0 mm, die length 5.0 mm) produced by Toyo Seiki Seisaku-sho, Ltd.

Further, when the thermoplastic copolymer (B) of this invention is produced, the raw materials may, as desired, include additives, for example, a hindered phenol-based, benzotriazole-based, benzophenone-based, benzoate-based or cyanoacrylate-based ultraviolet light absorber, antioxidant, lubricant such as higher fatty acid, acid ester-based or acid amide-based lubricant or higher alcohol, plasticizer, releasing agent such as montanic acid or any of its salts, esters or half esters, stearyl alcohol, stearamide or ethylene wax, coloration preventive such as phosphite or hypophosphite, halogen-based flame retarder, non-halogen-based flame retarder such as phosphorus-based or silicone-based flame retarder, nucleating agent, amine-based, sulfonic acid-based or polyether-based antistatic agent, colorant such as pigment, to such an extent that the object of this invention is not impaired. However, when the additives are added, it must be ensured that the color peculiar to each additive does not adversely affect the thermoplastic copolymer (B) of this invention or does not lower the transparency.

The thermoplastic copolymer (B) produced in this invention can be used for various applications such as electric and electronic parts, automobile parts, machine mechanism parts, housings and parts of OA apparatuses, household electric appliances and the like, and general miscellaneous goods, since it is excellent in heat resistance, colorless transparency and retention stability.

Further, the thermoplastic copolymer (B) obtained by the abovementioned process can be, for example, extruded, injection-molded or press-molded, since it is also excellent in mechanical properties and moldability and is melt-moldable. So, it can be molded into and used as films, sheets, pipes, rods and other molded articles with desired shapes and sizes.

Above all, as methods for producing films formed of the thermoplastic copolymer (B), publicly known methods can be used. That is, such production methods as inflation method, T-die method, calender method, cutting method, casting method, emulsion method and hot press method can be used. Preferably, inflation method, T-die method, casting method and hot press method can be used. In the case of production by inflation method or T-die method, a melt extruder having one or two extrusion screws or the like can be used. It is preferred that the melt extrusion temperature for producing the film of this invention is 150 to 350° C. A more preferred range is 200 to 300° C. In the case where a melt extruder is used for melt kneading, in view of inhibition of coloration, it is preferred to use a vent for performing melt kneading under reduced pressure or in nitrogen stream. Further, in the case where a casting method is used to produce the film of this invention, a solvent such as tetrahydrofuran, acetone, methyl ethyl ketone, dimethylformamide, dimethyl sulfoxide or N-methylpyrrolidone can be used. Preferred solvents are acetone, methyl ethyl ketone, N-methyl pyrrolidone, etc. The film can be produced by dissolving the thermoplastic resin composition of this invention into one or more of the aforementioned solvents, casting the solution on a flat sheet such as a heat resistant film of polyethylene terephthalate or the like, steel belt or metal foil or curved sheet (roll) using a bar coater, T die, T die with a bar, die coater, etc., and evaporating and removing the solvent as a dry method or solidifying the solution by a solidifying liquid as a wet method, etc.

Further, in this invention, a rubber-containing polymer (D) can be mixed with the thermoplastic copolymer (B) obtained by the abovementioned method, to obtain a thermoplastic resin composition with excellent impact resistance without greatly impairing the excellent properties of the thermoplastic copolymer (B).

As the rubber-containing polymer (D) used in this invention, a so-called core-shell type multilayer structure polymer with a structure consisting of a layer containing one or more rubbery polymers and one or more layers formed of a polymer dissimilar to the foregoing, with one or more rubbery polymer-containing layers placed inside, or a graft copolymer obtained by copolymerizing a monomer mixture containing a vinyl monomer and the like in the presence of a rubbery polymer, or the like can be preferably used.

The number of the layers constituting the core-shell type multilayer structure polymer used in this invention is only required to be two or more. The number of layers can also be three or four or more, but a multilayer structure polymer having one or more rubber layers inside (core layers) is preferred.

In the multilayer structure polymer of this invention, the materials of the rubber layers are not especially limited and are only required to be formed of polymer components with rubber elasticity. Examples of them include rubbers obtained by polymerizing acrylic monomers, silicone-based monomers, styrene-based monomers, nitrile-based monomers, conjugated diene-based monomers, monomers capable of producing urethane bonds, ethylene-based monomers, propylene-based monomers, isobutene-based monomers, etc. Examples of preferred rubbers include those composed of acrylic units such as ethyl acrylate units or butyl acrylate units, silicone-based units such as dimethylsiloxane units or phenylmethylsiloxane units, styrene-based units such as styrene units or α-methylstyrene units, nitrile-based units such as acrylonitrile units or methacrylonitrile units, or conjugated diene-based units such as butadiene units or isoprene units. Further, a rubber as a combination of two or more of these components is also preferred. Examples of such a rubber include (1) a rubber consisting of acrylic units such as ethyl acrylate or butyl acrylate and silicone-based units such as dimethylsiloxane units or phenylmethylsiloxane units, (2) a rubber consisting of acrylic units such as ethyl acrylate or butyl acrylate and styrene-based units such as styrene units or α-methylstyrene units, (3) a rubber consisting of acrylic units such as ethyl acrylate or butyl acrylate and conjugated diene-based units such as butadiene units or isoprene units, (4) a rubber consisting of acrylic units such as ethyl acrylate or butyl acrylate units, silicone-based units such as dimethylsiloxane units or phenylmethylsiloxane units and styrene-based units such as styrene units or α-methylstyrene units, etc. Among them, a rubber containing acrylic acid alkyl ester units and substituted or non-substituted styrene units is most preferred in view of transparency and mechanical properties. Further, a rubber obtained by crosslinking a copolymer consisting of the abovementioned components and a crosslinkable component such as divinylbenzene units, allyl acrylate units or butylene glycol diacrylate units is also preferred.

In the multilayer structure polymer of this invention, the materials of the layers other than rubber layers are not especially limited if they consist of thermoplastic polymer components, but it is preferred that the glass transition temperatures of the polymer components are higher than those of rubber layers. The thermoplastic polymers can be polymers containing one or more types of units selected from unsaturated carboxylic acid alkyl ester units, unsaturated carboxylic acid units, unsaturated glycidyl group-containing units, unsaturated dicarboxylic anhydride units, aliphatic vinyl units, aromatic vinyl units, vinyl cyanide units, maleimide units, unsaturated dicarboxylic acid units and other vinyl units, etc. Above all, polymers containing unsaturated carboxylic acid alkyl ester units are preferred, and polymers containing one or more types of units selected from unsaturated glycidyl group-containing units, unsaturated carboxylic acid units and unsaturated dicarboxylic anhydride units in addition to the unsaturated carboxylic acid alkyl ester units are more preferred.

The monomer as the raw material of the unsaturated carboxylic acid alkyl ester units is not especially limited, but an acrylic acid alkyl ester or methacrylic acid alkyl ester can be preferably used. Examples of the monomer include methyl acrylate, methyl methacrylate, ethyl acrylate, ethyl methacrylate, n-propyl acrylate, n-propyl methacrylate, n-butyl acrylate, n-butyl methacrylate, t-butyl acrylate, t-butyl methacrylate, n-hexyl acrylate, n-hexyl methacrylate, 2-ethylhexyl acrylate, 2-ethylhexyl methacrylate, cyclohexyl acrylate, cyclohexyl methacrylate, stearyl acrylate, stearyl methacrylate, octadecyl acrylate, octadecyl methacrylate, phenyl acrylate, phenyl methacrylate, benzyl acrylate, benzyl methacrylate, chloromethyl acrylate, chloromethyl methacrylate, 2-chloroethyl acrylate, 2-chloroethyl methacrylate, 2-hydroxyethyl acrylate, 2-hydroxyethyl methacrylate, 3-hydroxypropyl acrylate, 3-hydroxypropyl methacrylate, 2,3,4,5,6-pentahydroxyhexyl acrylate, 2,3,4,5,6-pentahydroxyhexyl methacrylate, 2,3,4,5-tetrahydroxypentyl acrylate, 2,3,4,5-tetrahydroxypentyl methacrylate, aminoethyl acrylate, propylaminoethyl acrylate, dimethylaminoethyl methacrylate, ethylaminopropyl methacrylate, phenylaminoethyl methacrylate, cyclohexylaminoethyl methacrylate, etc. In view of the large effect of enhancing impact resistance, methyl acrylate or methyl methacrylate can be preferably used. Any one of these types of units can be used alone or two or more of them can also be used.

Said unsaturated carboxylic acid monomer is not especially limited, and examples of it include acrylic acid, methacrylic acid, maleic acid, hydrolysis product of maleic anhydride, etc. Especially in view of excellent thermal stability, acrylic acid and methacrylic acid are preferred, and methacrylic acid is more preferred. Any one of them can be used or two or more of them can also be used.

The monomer as the raw material of said unsaturated glycidyl group-containing units is not especially limited. Examples of it include glycidyl acrylate, glycidyl methacrylate, glycidyl itaconate, diglycidyl itaconate, allyl glycidyl ether, styrene-4-glycidyl ether, 4-glycidyl styrene, etc. In view of the large effect of enhancing impact resistance, glycidyl acrylate and glycidyl methacrylate can be preferably used. Any one of the types of units can be used or two or more of them can also be used.

Examples of the monomer as the raw material of said unsaturated dicarboxylic anhydride units include maleic anhydride, itaconic anhydride, glutaconic anhydride, citraconic anhydride, aconitic anhydride, etc. In view of the large effect of enhancing impact resistance, maleic anhydride can be preferably used. Any one of the types of units can be used alone or two or more of them can also be used.

Further, as the monomer used as the raw material of said aliphatic vinyl units, ethylene, propylene, butadiene and the like can be used. As the monomer used as the raw material of said aromatic vinyl units, styrene, □-methylstyrene, 1-vinylnaphthalene, 4-methylstyrene, 4-propylstyrene, 4-cyclohexylstyrene, 4-dodecylstyrene, 2-ethyl-4-benzylstyrene, 4-(phenylbutyl)styrene, halogenated styrene and the like can be used. As the monomer used as the raw material of said vinyl cyanide units, acrylonitrile, methacrylonitrile, ethacrylonitrile and the like can be used. As the monomer used as the raw material of said maleimide units, maleimide, N-methylmaleimide, N-ethylmaleimide, N-propylmaleimide, N-isopropylmaleimide, N-cyclohexylmaleimide, N-phenylmaleimide, N-(p-bromophenyl)maleimide, N-(chlorophenyl)maleimide and the like can be used. As the monomer used as the raw material of said unsaturated dicarboxylic acid units, maleic acid, maleic acid monoethyl ester, itaconic acid, phthalic acid and the like can be used. As the monomer used as the raw material of said other vinyl units, acrylamide, methacrylamide, N-methylacrylamide, butoxymethylacrylamide, N-propylmethacrylamide, N-vinyldiethylamine, N-acetylvinylamine, allylamine, methallylamine, N-methylallylamine, p-aminostyrene, 2-isopropenyl-oxazoline, 2-vinyl-oxazoline, 2-acryloyl-oxazoline, 2-styryl-oxazoline and the like can be used. Any one of these monomers can be used alone or two or more of them can also be used.

In the multilayer structure polymer containing a rubbery polymer of this invention, the material of the outermost layer (shell layer) can be, as described above, at least one selected from polymers containing one or more types of units such as unsaturated carboxylic acid alkyl ester units, unsaturated carboxylic acid units, unsaturated glycidyl group-containing units, aliphatic vinyl units, aromatic vinyl units, vinyl cyanide units, maleimide units, unsaturated dicarboxylic acid units, unsaturated dicarboxylic anhydride units, other vinyl units, etc. Above all, preferred is at least one selected from the polymers containing unsaturated carboxylic acid alkyl ester units, unsaturated carboxylic acid units, unsaturated glycidyl group-containing units, unsaturated dicarboxylic anhydride units, etc.

Further, in this invention, as the rubbery polymer (D) to be melt-kneaded with the thermoplastic copolymer (B), it is most preferred to use a multilayer structure polymer in which a polymer containing unsaturated carboxylic acid alkyl ester units and unsaturated carboxylic acid units is used as the outermost layer. In the case where the outermost layer is formed of a polymer containing unsaturated carboxylic acid alkyl ester units and unsaturated carboxylic acid units, heating causes the intramolecular cyclization reaction to proceed as in the aforementioned production of the thermoplastic copolymer (B) of this invention, to produce the glutaric anhydride-containing units represented by said general formula (1). Therefore, when the multilayer structure polymer in which the outermost layer is formed of a polymer containing unsaturated carboxylic acid alkyl ester units and unsaturated carboxylic acid units is mixed and melt-kneaded with the thermoplastic copolymer (B) with heating, a multilayer structure polymer in which the outermost layer contains the glutaric anhydride-containing units represented by the general formula (1) can be obtained. Thus, a multilayer structure polymer containing the glutaric anhydride-containing units represented by said general formula (1) can be well dispersed in the thermoplastic copolymer (B) constituting a continuous phase (matrix phase), and this is considered to be the reason why the mechanical properties such as impact resistance of the thermoplastic resin composition of this invention can be enhanced and why very high transparency can be exhibited.

As the monomer used as the raw material of unsaturated carboxylic acid alkyl ester units referred to here, an acrylic acid alkyl ester or methacrylic acid alkyl ester is preferred, and further methyl acrylate or methyl methacrylate can be more preferably used.

Further, as the monomer used as the raw material of unsaturated carboxylic acid units, acrylic acid or methacrylic acid is preferred, and methacrylic acid can be more preferably used.

Preferred examples of the multilayer structure polymer to be contained in the thermoplastic resin composition of this invention include that in which the core layer is formed of butyl acrylate/styrene copolymer while the outermost layer is formed of a copolymer consisting of methyl methacrylate/glutaric anhydride-containing units represented by said general formula (1), that in which the core layer is formed of butyl acrylate/styrene copolymer while the outermost layer is formed of methyl methacrylate/glutaric anhydride-containing units represented by said general formula (1)/methacrylic acid copolymer, that in which the core layer is formed of dimethylsiloxane/butyl acrylate copolymer while the outermost layer is formed of methyl methacrylate polymer, that in which the core layer is formed of butadiene/styrene copolymer while the outermost layer is formed of methyl methacrylate polymer, that in which the core layer is formed of butyl acrylate polymer while the outermost layer is formed of methyl methacrylate polymer, etc. In the above, "/" indicates copolymerization. Moreover, a further other preferred example is that in which the rubber layer and/or the outermost layer are/is formed of a polymer containing glycidyl methacrylate units. Above all, a multilayer structure polymer in which the core layer is formed of butyl acrylate/styrene copolymer while the outermost layer is formed of a copolymer consisting of methyl methacrylate/glutaric anhydride-containing units represented by said general formula (1) and that in which the core layer is formed of butyl acrylate/styrene copolymer while the outermost layer is formed of methyl methacrylate/glutaric anhydride-containing units represented by said general formula (1)/methacrylic acid polymer can be preferably used for such reasons that the refractive index can be made closer to that of the thermoplastic copolymer (B) used as the continuous phase (matrix phase) and that a good dispersion state in the resin composition can be obtained to exhibit transparency satisfactory in the level required to be higher in recent years.

In the multilayer structure polymer of this invention, it is preferred that the ratio by weight of the core layer to the shell layer is such that the amount of the core layer is 50 wt % to 90 wt % based on the total weight of the multilayer structure polymer. A more preferred range is 60 wt % to 80 wt %.

Further, the primary particle size of the multilayer structure polymer used in this invention can be properly controlled by adjusting the particle size of the rubber used in the core layer and the amount of the thermoplastic polymer used as the shell layer.

As the multilayer structure polymer of this invention, a commercially available product satisfying the abovementioned conditions can be used or a polymer prepared by a publicly known method can also be used.

Commercially available products of the multilayer structure polymer include, for example, "Metablen (registered trademark)" produced by Mitsubishi Rayon Co., Ltd., "Kane Ace (registered trademark)" produced by Kaneka Corp, "Paraloid (registered trademark)" produced by Kureha Chemical Industry Co., Ltd., "Acryloid (registered trademark)" produced by Rohm and Haas, "Staphyloid (registered trademark)" produced by Ganz Chemical Co., Ltd., "Parapet (registered trademark) SA" produced by Kuraray Co., Ltd., etc. Any one of them can be used alone or two or more of them can also be used together.

Further, the rubber-containing graft copolymer used as the rubber-containing polymer (D) of this invention can be, for example, a graft copolymer obtained by copolymerizing a monomer mixture consisting of an unsaturated carboxylic acid ester monomer, unsaturated carboxylic acid monomer, aromatic vinyl monomer, and as required a further other vinyl monomer copolymerizable with the foregoing in the presence of a rubbery polymer.

As the rubbery polymer used in the graft copolymer, a diene rubber, acrylic rubber, ethylene rubber or the like can be used. Examples of them include polybutadiene, styrene-butadiene copolymer, styrene-butadiene block copolymer, acrylonitrile-butadiene copolymer, butyl acrylate-butadiene copolymer, polyisoprene, butadiene-methyl methacrylate copolymer, butyl acrylate-methyl methacrylate copolymer, butadiene-ethyl acrylate copolymer, ethylene-propylene copolymer, ethylene-propylene-butadiene copolymer, ethylene-isoprene copolymer, ethylene-methyl acrylate copolymer, etc. Any one of these rubbery polymers can be used or two or more of them can also be used as a mixture.

The graft copolymer of this invention can be obtained by copolymerizing 20 to 90 wt %, preferably 30 to 80 wt %, more preferably 40 to 70 wt % of said monomers (mixture) in the presence of 10 to 80 wt %, preferably 20 to 70 wt %, more preferably 30 to 60 wt % of a rubbery polymer. In the case where the amount of the rubbery polymer is less than or more than the abovementioned range, impact strength and surface appearance may decline.

Meanwhile, the graft copolymer may also contain a non-grafted copolymer produced when the monomer mixture is graft-copolymerized with the rubbery polymer. In view of impact strength, it is preferred that the graft rate is 10 to 100%. In this case, the graft rate refers to the rate of the weight of the monomer mixture grafted to the rubbery polymer. A non-grafted copolymer with an intrinsic viscosity of 0.1 to 0.6 dl/g as measured in methyl ethyl ketone solvent at 30° C. can be preferably used in view of the balance between impact strength and moldability.

The intrinsic viscosity of the graft copolymer of this invention measured in methyl ethyl ketone solvent at 30° C. is not especially limited, but a graft copolymer of 0.2 to 1.0 dl/g can be preferably used in view of the balance between impact strength and moldability. A more preferred range is 0.3 to 0.7 dl/g.

The method for producing the graft copolymer in this invention is not especially limited and a publicly known polymerization method such as bulk polymerization, solution polymerization, suspension polymerization or emulsion polymerization can be used to obtain the graft copolymer.

Further, the primary particle size of the graft copolymer used in this invention can be properly controlled by adjusting the particle size of the rubbery polymer and the amount of the monomer mixture to be graft-copolymerized.

Furthermore, it is preferred that the refractive index of the thermoplastic polymer (B) and the refractive index of the rubber-containing polymer (D) are close to each other, since a thermoplastic resin composition with excellent transparency can be obtained. Particularly, it is preferred that the difference between both in refractive index is 0.05 or less. More preferred is 0.02 or less, and especially preferred is 0.01 or less. Such a refractive index condition can be satisfied by a method of adjusting the ratio of the respective types of monomer units of the thermoplastic copolymer (B) and/or adjusting the rubbery polymer or the monomer composition used in the rubber-containing polymer (D).

Meanwhile, the refractive index difference referred to here is the value measured according to the following method. The thermoplastic resin composition of this invention is sufficiently dissolved into a solvent capable of dissolving the thermoplastic copolymer (B) under appropriate conditions, to prepare a white turbid solution, and the solution is separated into a solvent soluble portion and an insoluble portion by such an operation as centrifugal separation. The soluble portion (portion containing the thermoplastic polymer (B)) and the insoluble portion (portion containing the rubber-containing polymer (D)) are respectively refined, and their refractive index values (23° C., measurement wavelength 550 nm) are measured. The difference between the values is defined as the refractive index difference.

Further, with regard to the copolymer compositions of the thermoplastic copolymer (B) and the rubber-containing polymer (D) in the resin composition, after the operation of separating the resin composition into the soluble component and the insoluble component using said solvent, the respective components are individually analyzed.

Furthermore, it is preferred that the ratio by weight at which the thermoplastic polymer (B) and the rubber-containing polymer (D) are mixed is in a range from 99/1 to 50/50. A more preferred range is 99/1 to 60/40, and the most preferred range is 99/1 to 70/30.

When the thermoplastic resin composition of this invention is produced, a method of heating, melting and mixing the thermoplastic polymer (B) and the rubber-containing polymer (D) in an appropriate shear field is used. As the method for heating, melting and mixing the thermoplastic polymer (B) and the rubber-containing polymer (D) in this invention, a method of blending the thermoplastic polymer (B) and other arbitrary ingredients beforehand and subsequently uniformly melt-kneading using a single screw or double screw extruder can be preferably used in view of dispersibility and productivity.

In order to inhibit the cohesion of the rubber-containing polymer particles in the thermoplastic resin composition to be produced, it is preferred to melt-knead at a relatively low temperature by keeping the rotational speed low for preventing that a high shear force acts. Particularly, it is preferred that the resin temperature (T) in the kneading zone is controlled in a range of (Tg of thermoplastic polymer (B)+100° C.)$\leq$T$\leq$(1% decomposition temperature of rubber-containing polymer (D)). Further, it is more preferred to control the resin temperature in a range of (Tg of thermoplastic polymer (B)+120° C.)$\leq$T$\leq$(0.5% decomposition temperature of rubber-containing polymer (D)). In this case, the 1% decomposition temperature of the rubber-containing polymer (D) is the temperature at which the weight loss rate reaches 1% with the weight of the rubber-containing polymer (D) before heating as 100% in a heating test in which the rubber-containing polymer (D) is heated at a rate of 20° C./min in a temperature range from 100 to 450° C. in nitrogen using a differential thermogravimeter (TG/DTA-200 produced by Seiko Instruments Inc.). It is not preferred that the resin temperature is lower than the range of this invention, since the melt viscosity becomes very high, virtually not allowing melt kneading. Further, it is not preferred either that the resin temperature is higher than the range of this invention, since the re-cohesion and coloration of the rubber-containing polymer (D) become conspicuous.

Further, it was found that if the shear rate is controlled to be low during melt kneading, the cohesion of rubber-containing polymer particles can be inhibited as described above, and that a very good color tone can be obtained. That is, in the case where melt kneading is performed with the rotational speed (N rpm) of the screw(s) kept in a range of N$\leq$150, since the decomposition of the thermoplastic resin composition can be inhibited while the dispersibility of the rubber-containing polymer (D) is kept good, a great color tone improving effect can be obtained. A preferred range is 10$\leq$N$\leq$100, and a more preferred range is 20$\leq$N$\leq$50. It is not preferred that the value of N is more than 150, since the shear force action and the heat generated by it cause the dispersed rubber-containing polymer (D) to be decomposed and to cohere again, causing remarkable coloration. On the other hand, it is not preferred either that the value of N is smaller than 10, since the dispersion of the rubber-containing polymer (D) becomes insufficient, causing the deterioration of surface smoothness and the decline of impact strength and heat resistance.

Further in this invention, it is not preferred that the screw length is too long compared with the screw diameter in the melting zone and the kneading zone of the extruder used for melt kneading. In this case, the melting zone is defined as a zone between the starting point corresponding to the position where the resin supplied to the screw to reach the first kneading zone is perfectly molten and the end point corresponding to the position of discharge port. Further, the kneading zone consists of a kneading disc and a reverse full-flighted disc, being a zone intended for kneading and retaining the resin. In the case where there are two or more kneading zones, they are considered as one integral zone in the following explanation. If the screw length in the melting zone is Lm, the screw length in the kneading zone is Lk and the screw diameter is D, then Lm/D≦30 and Lk/D≦5 are preferred. More preferred are Lm/D≦25 and Lk/D≦5. Further more preferred are Lm/D≦20 and Lk/D≦4. As the lower limits, in view of the dispersibility of rubber by shear force, Lm/D≧10 and Lk/D≧3 are preferred. It is not preferred that the value of Lm/D is larger than 30 or that the value of Lk/D is larger than 5, since the shear force becomes so strong that the dispersed rubber-containing polymer (B) is decomposed and made to re-cohere for causing remarkable coloration. Further, if the value of Lm/D is smaller than 15 or the value of Lk/D is smaller than 3, then the dispersion of the rubber-containing polymer (B) becomes insufficient, and the deterioration of surface smoothness and the decline of impact strength and heat resistance are likely to be caused. Further, it is preferred that there are two or more melting zones. If there is one or no melting zone, the decline of surface smoothness, impact strength and heat resistance is likely to be caused.

Further, the thermoplastic polymer and the thermoplastic resin composition of this invention can contain one or more selected from other thermoplastic resins such as polyethylene, polypropylene, acrylic resin, polyamide, polyphenylene sulfide resin, polyetheretherketone resin, polyester, polysulfone, polyphenylene oxide, polyacetal, polyimide and polyetherimide, and thermosetting resins such as phenol resin, melamine resin, polyester resin, silicone resin and epoxy resin, to such an extent that the object of this invention is not impaired. Furthermore, the thermoplastic polymer and the thermoplastic resin composition of this invention may contain additives, for example, a hindered phenol-based, benzotriazole-based, benzophenone-based, benzoate-based or cyanoacrylate-based ultraviolet light absorber, antioxidant, lubricant such as higher fatty acid, acid ester-based or acid amide-based lubricant or higher alcohol, plasticizer, releasing agent such as montanic acid or any of its salts, esters or half esters, stearyl alcohol, stearamide or ethylene wax, coloration preventive such as phosphite or hypophosphite, halogen-based flame retarder, non-halogen-based flame retarder such as phosphorus-based or silicone-based flame retarder, nucleating agent, amine-based, sulfonic acid-based or polyether-based antistatic agent, colorant such as pigment, dye or optical brightening agent. However, when the additives are added, it is preferred to ensure that the color peculiar to each additive does not adversely affect the thermoplastic copolymer in view of the properties required for the application concerned or does not lower the transparency.

The thermoplastic resin composition of this invention can be, for example, extruded, injection-molded or press-molded since it is excellent in mechanical properties and moldability and is melt-moldable. So, it can be molded into and used as films, sheets, pipes, rods and other molded articles with desired shapes and sizes.

As methods for producing films using the thermoplastic resin composition of this invention, publicly known methods can be used. That is, such production methods as inflation method, T-die method, calender method, cutting method, casting method, emulsion method and hot press method can be used. Preferably, inflation method, T-die method, casting method or hot press method can be used. In the case of production by inflation method or T-die method, a melt extruder having one or two extrusion screws or the like can be used. It is preferred that the melt extrusion temperature for producing the film of this invention is 150 to 350° C. A more preferred range is 200 to 300° C. In the case where a melt extruder is used for performing melt kneading, in view of inhibiting coloration, it is preferred to use a vent for performing melt kneading under reduced pressure or in nitrogen stream. Further, in the case where a casting method is used to produce the film of this invention, a solvent such as tetrahydrofuran, acetone, methyl ethyl ketone, dimethylformamide, dimethyl sulfoxide or N-methyl pyrrolidone can be used. Preferred solvents are acetone, methyl ethyl ketone, N-methylpyrrolidone, etc. The film can be produced by dissolving the thermoplastic resin composition of this invention into one or more of the aforementioned solvents, casting the solution on a flat sheet such as a heat resistant film of polyethylene terephthalate or the like, steel belt or metal foil or curved sheet (roll) using a bar coater, T die, T die with a bar, die coater, etc., and evaporating and removing the solvent as a dry method or solidifying the solution by a solidifying liquid as a wet method, etc.

Particular applications of the moldings made from the thermoplastic resin composition containing the thermoplastic copolymer (B) and the rubbery polymer (D) produced by the process of this invention include, for example, electric and electronic parts typified by housings of electric apparatuses, housings of OA apparatuses, various covers, various gears, various cases, sensors, LED lamps, connectors, sockets, resistors, relay cases, switches, coil bobbins, capacitors, variable capacitor cases, optical pickups, oscillators, various terminal boards, transformers, plugs, printed wiring boards, tuners, speakers, microphones, headphones, small motors, magnetic head bases, power modules, housings, semiconductors, liquid crystals, FDD carriages, FDD chassis, motor brush holders, parabolic antennas and computer-related parts; household and office electric appliance parts typified by audio apparatus parts such as VTR parts, TV parts, irons, hair dryers, rice cooker parts, electronic oven parts, acoustic parts, audio laser discs and compact discs, illumination parts, refrigerator parts, air conditioner parts, typewriter parts and word processor parts, machine related parts typified by office computer related parts, telephone set related parts, facsimile related parts, copier related parts, washing jigs, bearings such as oilless bearings, tail-shaft bearings and submerged bearings, motor parts, lighters and typewriters, parts related to optical apparatuses and precision machines typified by microscopes, binoculars, cameras and timepieces; alternator terminals, alternator connectors, IC regulators, various valves such as exhaust gas valves, various pipes for fuel, exhaust systems and suction systems, air intake nozzle snorkels, intake manifolds, fuel pumps, engine cooling water joints, carburetor main bodies, carburetor spacers, exhaust gas sensors, cooling water sensors, oil temperature sensors, brake pad wear sensors, throttle position sensors, crankshaft position sensors, air flow meters, thermostat bases for air conditioners, space heating hot air flow control valves, brush holders for radiator motors, water pump impellers, turbine vanes, wiper motor related parts, distributors, starter switches, starter relays, transmission wire harnesses, window washer nozzles, air conditioner panel switch boards, coils for fuel related electromagnetic valves, fuse connectors, horn terminals, insulation boards for electric equipment parts, step motor rotors, lamp sockets, lamp reflectors, lamp housings, brake pistons, solenoid bobbins, engine oil filters, igniter cases, etc. Further, since the thermoplastic resin composition of this invention is excellent in transparency and heat resistance, it can be applied to video apparatus related parts such as photographic lenses for cameras, VTRs and projection TV sets, finders, filters, prisms and Fresnel lenses, optical recording/optical communication related parts such as substrates of various optical discs (VD, CD, DVD, MD, LD, etc.), substrate protection films of various discs, optical disc player pickup lenses, optical fibers, optical switches and optical connectors, information apparatus related parts such as light guide plates of liquid crystal displays, flat panel displays and plasma displays, Fresnel lenses, polarizing plates, polarizing plate protection films, phase difference films, optical diffusion films, visibility angle expansion films, reflection films, reflection prevention films, glare-proof films, luminance-enhancing films, prism sheets, pickup lenses, touch panel light guide films and covers, parts relating to transport apparatuses including motor vehicles such as tail lamp lenses, head lamp lenses, inner lenses, amber caps, reflectors, extensions, side mirrors, room mirrors, side visors, meter needles, meter covers and glazing typified by window glass, medical apparatus related parts such as spectacle lenses, spectacle frames, contact lenses, endoscopes and optical cells for analysis, architecture related parts such as daylight windows, transparent road plates, illumination covers, signboards, transparent sound insulation walls and bathtub materials. The thermoplastic resin composition of this invention is very useful for these various applications.

EXAMPLES

This invention is explained below in reference to examples, but is not limited thereto or thereby. Respective measurements and evaluations were made according to the following methods.

(1) Polymer Content (Solid Content) (wt %)

Five grams of the copolymer solution (a) obtained in the polymerization step was dissolved into 50 g of tetrahydrofuran, and the solution was re-precipitated in 500 g of hexane. The mixture was filtered, and the residue was dried in vacuum at 140° C. for 1 hour, to obtain the copolymer (A) as a white powder. The obtained copolymer (A) was weighed, and the polymer content in the copolymer solution (a) was calculated from the following formula.

$$\text{Polymer content (wt \%)} = \{(S0-A1)/S0\} \times 100$$

where the respective symbols denote the following values.
A1=Weight of the copolymer (A) after drying (g)
S0=Weight of the copolymer solution (a) (g)

(2) Polymerization Percentage ($\phi$)

The unreactive monomer concentrations (wt %) in the copolymer solution (a) and the supplied raw material solution were determined by a gas chromatograph, and the polymerization percentage was calculated from the following formula.

$$\text{Polymerization percentage } (\phi) = 100 \times (1 - M1/M0)$$

where the respective symbols denote the following values.
M1=Unreactive monomer concentration in the copolymer solution (a) (wt %)
M0=Monomer concentration in the supplied raw material solution (wt %)

(3) Volatile Component Content

One gram of the copolymer (A) not yet introduced into the cyclization step or one gram of the thermoplastic copolymer (B) after cyclization was dissolved into 20 g of tetrahydrofuran, and the remaining unreactive monomers and/or the organic solvent (C) was determined by a gas chromatograph. The volatile component content was calculated from the following formula.

$$\text{Volatile component content (wt \%)} = \{(\alpha+\beta)/P1\} \times 100$$

where the respective symbols denote the following values.
$\alpha$=Weight of the remaining monomers determined by gas chromatograph (g)
$\beta$=Weight of the organic solvent (C) determined by gas chromatograph (g)
P1=Weight of the sampled copolymer (A) or thermoplastic polymer (B) (g)

(4) Weight Average Molecular Weight/Molecular Weight Distribution

Ten milligrams of the obtained copolymer (A) or thermoplastic copolymer (B) was dissolved into 2 g of tetrahydrofuran, to obtain a sample to be measured. A gel permeation chromatograph (pump . . . 515 produced by Waters, column . . . TSK-gel-GMHXL produced by Tosoh Corporation) equipped with DAWN-DSP multi-angle light scattering photometer (produced by Wyatt Technology) was used to measure the weight average molecular weight (absolute molecular weight) and the number average molecular weight (absolute molecular weight) using tetrahydrofuran as the solvent. The molecular weight distribution was calculated from Weight average molecular weight (absolute molecular weight)/Number average molecular weight (absolute molecular weight).

(5) Chemical Composition Analysis for Determining Respective Components $^1$H-1-NMR was measured in deuterated dimethyl sulfoxide at 30□ C., to determine the respective copolymer components.

(6) Glass Transition Temperature (Tg)

A differential scanning calorimeter (DSC-7 produced by Perkin Elmer) was used to measure at a heating rate of 20° C./min in nitrogen atmosphere.

(7) Transparency (Overall Light Transmittance, Haze)

The obtained thermoplastic copolymer was injection-molded at glass transition temperature+140 □C, to obtain a 1 mm thick molding. The overall light transmittance (%) of the molding at 23° C. was measured using a direct reading haze meter produced by Toyo Seiki Seisaku-sho, Ltd., to evaluate transparency.

(8) Yellowness Index

The obtained thermoplastic copolymer was injection-molded at glass transition temperature+140° C., to obtain a 1 mm thick molding, and the YI value of the molding was measured using an SM color computer (produced by Suga Test Instruments Co., Ltd.) according to JIS K 7103.

(9) Number of Foreign Matter Pieces

The obtained thermoplastic copolymer pellets were dissolved into methyl ethyl ketone at a concentration of 25 wt % with stirring at room temperature for 24 hours, and the obtained thermoplastic copolymer solution was cast on a glass sheet and treated to be dried at 50° C. for 20 minutes and then at 80° C. for 30 minutes, to prepare a 100±5 μm thick film. The film was observed with an optical microscope, and the number of foreign matter pieces of 20 μm or more per 1 mm square unit area was counted. The observation and counting of the number of foreign matter pieces were performed at 10 places at random per sample, and the mean value was employed as the number of foreign matter pieces per 1 mm square unit area (pieces/mm$^2$).

(10) Amount of Gas Generation During Retention

Five grams of the obtained thermoplastic copolymer (B) pellets were preliminarily dried at 80° C. for 12 hours and heat-treated in a heating furnace controlled at glass transition temperature+130° C. for 30 minutes. Before and after the heat treatment, the copolymer was weighed, and the weight loss rate calculated from the following formula was employed as the amount of gas generation during retention.

Weight loss rate (wt %)={($W0-W1$)/$W0$}×100 where the respective symbols denote the following values.

W0=Weight of the thermoplastic copolymer (B) before heat treatment (g)

W1=Weight of the thermoplastic copolymer (B) after heat treatment (g)

(11) Melt Viscosity of Thermoplastic Copolymer (B)

The obtained thermoplastic copolymer (B) pellets were preliminarily dried at 80° C. for 12 hours, and Capilograph 1C (die diameter 1 mm, die length 5 mm) produced by Toyo Seiki Seisaku-sho, Ltd.) was used to measure at glass transition temperature+130° C. and a shear rate of 12/second.

Example 1

Polymerization Step: Continuous Bulk Polymerization Method

A stainless steel autoclave having a capacity of 20 liters and double helical stirring blades was continuously supplied with the following monomer mixture bubbled by 20 L/min of nitrogen gas for 15 minutes at a rate of 8 kg/h, and the mixture was stirred at 50 rpm with the inner temperature controlled at 130° C. for an average retention time of 3 hours, for being continuously polymerized. The obtained copolymer solution (a) was sampled and analyzed. As a result, the polymerization percentage was 60%, and the content, namely, solid content of the copolymer (A) in the copolymer solution (a) was 60 wt %. Further, the viscosity of the obtained copolymer solution (a) was measured at 30° C. and found to be 60 Pa□s.

| | |
|---|---|
| Methacrylic acid | 30 parts by weight |
| Methyl methacrylate | 70 parts by weight |
| 1,1-di-t-butyl peroxy cyclohexane | 0.05 part by weight |
| n-dodecyl mercaptan | 0.3 part by weight |

Devolatilization Step

In succession, the copolymer solution (a) obtained in the abovementioned polymerization step was continuously supplied into a 44 mm φ double screw extruder TEX-44 (produced by The Japan Steel Works, Ltd., L/D=45.0, one back vent, three fore vents) at a rate of 8.0 kg/h using a gear pump, and treated for devolatilization at a screw speed of 75 rpm and a cylinder temperature of 150° C. with the pressure reduced to 20 Torr via the vents. At this moment, the devolatilized copolymer (A) was sampled, and the contained volatile component was measured.

Cyclization Step

In succession, the copolymer (A) obtained in the devolatilization step was continuously supplied into a spectacle-shaped blade horizontal double screw stirrer ("Hitachi Spectacle-shaped Blade Polymerizer (trade name)" produced by Hitachi, Ltd., capacity 24 L, one vent) at a supply rate of 4.7 kg/h using a gear pump, and cyclization reaction was performed at a screw speed of 10 rpm and a cylinder temperature of 300° C. with the pressure reduced to 10 Torr via the vent. A strand cutter was used for pelletization, to produce a thermoplastic copolymer (B-1) at a rate of 4.6 kg/h. The average retention time in the cyclization apparatus in this case was 60 minutes.

The pellets of the obtained (B-1) were dried at 100° C. for 8 hours and determined by $^1$H-NMR. The amounts of the respective components of the copolymer and the evaluation results of respective properties are shown in Table 3.

Volatile Component Recovery Step: Recovery of Unreactive Monomers

The vents of the double screw extruder of the abovementioned former devolatilization step and the back vents of the double screw extruder of the abovementioned latter devolatilization step were connected with a condenser, and the volatile component was recovered at 2.8 kg/h. In succession, the recovered solution was supplied to a distillation column and distilled under reduced pressure at 90° C. and 400 Torr, to be continuously refined, 97% being recovered as raw materials. The recovered raw materials were recycled as a raw material mixture into the polymerization step.

Examples 2 to 7

Continuous Bulk Polymerization and Continuous Solution Polymerization

Thermoplastic copolymers (B-2) to (B-7) were continuously produced and unreactive monomers and organic solvent (C) were recovered according to the same method as described in Example 1, except that the composition of raw materials and the production conditions in the respective steps of polymerization, devolatilization and cyclization were changed as shown in Tables 1 and 2. The evaluation results of the obtained thermoplastic copolymers (B) are shown in Table 3.

Example 8

Polymerization Step: Continuous Solution Polymerization Method

A stainless steel autoclave having a capacity of 20 liters and double helical stirring blades was continuously supplied with the following raw material mixture bubbled by 20 L/min of nitrogen gas for 15 minutes at a rate of 8 kg/h, and the mixture was stirred at 50 rpm with the internal temperature controlled at 130° C. for an average retention time of 3 hours, for being continuously polymerized. The obtained copolymer solution (a) was sampled and analyzed. As a result, the polymerization percentage was 77% and the content, namely, solid content of the copolymer (A) in the copolymer solution (a) was 50 wt %. Further, the viscosity of the obtained copolymer solution (a) was measured at 30° C. and found to be 50 Pa·s

| | |
|---|---|
| Methacrylic acid | 30 parts by weight |
| Methyl methacrylate | 70 parts by weight |
| Methyl ethyl ketone | 66 parts by weight |
| 1,1-di-t-butyl peroxy cyclohexane | 0.1 part by weight |
| n-dodecyl mercaptan | 0.3 part by weight |

Devolatilization Step

In succession, the copolymer solution (a) obtained in the abovementioned polymerization step was continuously supplied into a 44 mm φ double screw extruder (TEX 44 (produced by The Japan Steel Works, Ltd., L/D=45.0, one back vent, three fore vents) at a supply rate of 8.0 kg/h using a gear pump, and devolatilization treatment was performed at a screw speed of 75 rpm and a cylinder temperature of 150° C. with the pressure reduced to 20 Torr via the vents. At this moment, the devolatilized copolymer (A) was sampled, and the contained volatile component was measured.

Cyclization Step

In succession, the copolymer (A) obtained in the devolatilization step was continuously supplied into a spectacle-shaped blade horizontal double screw stirrer ("Hitachi Spectacle-shaped Blade Polymerizer (trade name)" produced by Hitachi, Ltd., capacity 24 L, one vent) at a supply rate of 3.8 kg/h, and cyclization reaction was performed at a screw speed of 10 rpm and a cylinder temperature of 300° C., with the pressure reduced to 10 Torr via the vent. A strand cutter was used for pelletization, to produce a thermoplastic copolymer (B-8) at a rate of 3.6 kg/h. The average retention time in the cyclization apparatus in this case was 60 minutes.

The pellets of the obtained (B-8) were dried at 100° C. for 8 hours, and determined by $^1$H-NMR. The amounts of the respective components of the copolymer and the evaluation results of respective properties are shown in Table 3.

Volatile Component Recovery Step: Recovery of Unreactive Monomers and Organic Solvent (C)

The vents of the double screw extruder of the abovementioned devolatilization step were connected with a condenser, and the volatile component was recovered at 4.2 kg/h. In succession, the recovered solution was supplied to a distillation column and distilled under reduced pressure at 90° C. and 400 Torr, to be continuously refined, 97% being recovered as raw materials. The recovered raw materials were recycled as a raw material mixture into the polymerization step.

Examples 9 to 13

Continuous Bulk Polymerization and Continuous Solution Polymerization

Thermoplastic copolymers (B-9) to (B-13) were continuously produced and unreactive monomers and organic solvent (C) were recovered according to the same method as described in Example 8, except that the composition of raw materials and the production conditions in the respective steps of polymerization, devolatilization and cyclization were changed as shown in Tables 1 and 2. The evaluation results of the obtained thermoplastic copolymers (B) are shown in Table 3.

Example 14

Polymerization Step: Continuous Solution Polymerization Method

A stainless steel autoclave having a capacity of 20 liters and double helical stirring blades was continuously supplied with the following raw material mixture bubbled by 20 L/min of nitrogen gas for 15 minutes at a rate of 8.0 kg/h, and the mixture was stirred at 50 rpm with the internal temperature controlled at 130° C. for an average retention time of 3 hours, for being continuously polymerized. The obtained copolymer solution (a) was sampled and analyzed. As a result, the polymerization percentage was 77% and the content, namely, solid content of the copolymer (A) in the copolymer solution (a) was 50 wt %. Further, the viscosity of the obtained copolymer solution (a) was measured at 30° C. and found to be 50 Pa·s.

| | |
|---|---|
| Methacrylic acid | 30 parts by weight |
| Methyl methacrylate | 70 parts by weight |
| Methyl ethyl ketone | 66 parts by weight |
| 1,1-di-t-butyl peroxy cyclohexane | 0.1 part by weight |
| n-dodecyl mercaptan | 0.3 part by weight |

Devolatilization Step

In succession, the copolymer solution (a) obtained in the abovementioned polymerization step was continuously supplied into a 44 mm φ double screw extruder TEX 44 (produced by The Japan Steel Works, Ltd., L/D=10.0, one back vent, three fore vents) at a supply rate of 8.0 kg/h using a gear pump, and former devolatilization treatment was performed at a screw speed of 75 rpm, a cylinder temperature of 150° C. and at a pressure of 760 Torr with the pressure not reduced via the vents. At this moment, the devolatilized copolymer (A) was sampled, and the contained volatile component was measured.

Further, the copolymer (a) obtained in the former devolatilization substep was continuously supplied into a 44 mm φ double screw extruder (TEX 44 (produced by The Japan Steel Works, Ltd., L/D=35.0, one back vent, two fore vents) at a supply rate of 4.0 kg/h using a gear pump, and latter devolatilization treatment was performed at a screw speed of 75 rpm and a cylinder temperature of 260° C. with the pressure reduced to 20 Torr via the fore vents. At this moment, the devolatilized copolymer (A) was sampled, and the contained volatile component was measured.

Cyclization Step

In succession, the copolymer (A) obtained in the devolatilization step was continuously supplied into a spectacle-shaped blade horizontal double screw stirrer ("Hitachi Spectacle-shaped Blade Polymerizer (trade name)" produced by Hitachi, Ltd., capacity 24 L, one vent) at a supply rate of 3.8 kg/h, and cyclization reaction was performed at a screw speed of 10 rpm and a cylinder temperature of 300° C., with the pressure reduced to 10 Torr via the vent. A strand cutter was used for pelletization, to produce a thermoplastic copolymer (B-14) at a rate of 3.6 kg/h. The average retention time in the cyclization apparatus in this case was 60 minutes.

The pellets of the obtained (B-14) were dried at 100° C. for 8 hours, and determined by $^1$H-NMR. The amounts of the respective components of the copolymer and the evaluation results of respective properties are shown in Table 3.

Volatile Component Recovery Step: Recovery of Unreactive Monomers and Organic Solvent (C)

The vents of the double screw extruder of the abovementioned former devolatilization substep were connected with a condenser, and the volatile component was recovered at 4.2 kg/h. In succession, the recovered solution was supplied to a distillation column and distilled under reduced pressure at 90° C. and 400 Torr, to be continuously refined, 97% being recovered as raw materials. The recovered raw materials were recycled as a raw material mixture into the polymerization step.

Examples 15 to 19

Thermoplastic copolymers (B-15) to (B-19) were continuously produced and unreactive monomers and organic solvent (C) were recovered according to the same method as described in Example 14, except that the composition of raw materials and the production conditions in the respective steps of polymerization, devolatilization and cyclization were changed as shown in Tables 1 and 2. The evaluation results of the obtained thermoplastic copolymers (B) are shown in Table 3.

TABLE 1

| | | Polymerization step | | | | | | | | |
|---|---|---|---|---|---|---|---|---|---|---|
| | Polymerization method | Amounts of supplied monomers (wt %) | | | Organic solvent (C) (wt %) | Radical initiator * (parts by weight) | Chain transfer agent (parts by weight) nDM | Polymerization temperature (° C.) | Half life of initiator (min) | Retention time (h) |
| | | MMA | MAA | ST | | | | | | |
| Example 1 | Bulk polymerization | 70 | 30 | 0 | — | (a) 0.05 | 0.3 | 130 | 12 | 3.0 |
| Example 2 | Bulk polymerization | 70 | 30 | 0 | — | (a) 0.05 | 0.6 | 130 | 12 | 3.0 |
| Example 3 | Bulk polymerization | 70 | 30 | 0 | — | (a) 0.05 | 0.8 | 130 | 12 | 3.0 |
| Example 4 | Bulk polymerization | 70 | 30 | 0 | — | (a) 0.05 | 0.8 | 130 | 12 | 4.0 |
| Example 5 | Bulk polymerization | 80 | 20 | 0 | — | (a) 0.05 | 0.8 | 130 | 12 | 3.0 |
| Example 6 | Solution polymerization | 75 | 25 | 0 | MEK, 10 parts | (a) 0.05 | 0.8 | 130 | 12 | 4.0 |
| Example 7 | Solution polymerization | 75 | 25 | 0 | PM, 10 parts by weight | (a) 0.05 | 0.8 | 130 | 12 | 4.0 |
| Example 8 | Solution polymerization | 70 | 30 | 0 | MEK, 66 parts | (a) 0.1 | 0.3 | 130 | 12 | 4.0 |
| Example 9 | Solution polymerization | 70 | 30 | 0 | MEK, 66 parts | (a) 0.1 | 0.6 | 130 | 12 | 4.0 |
| Example 10 | Solution polymerization | 70 | 30 | 0 | MEK, 66 parts | (a) 0.1 | 0.8 | 130 | 12 | 4.0 |
| Example 11 | Solution polymerization | 80 | 20 | 0 | MEK, 66 parts | (a) 0.1 | 0.3 | 130 | 12 | 4.0 |
| Example 12 | Solution polymerization | 80 | 20 | 0 | MEK, 66 parts | (a) 0.1 | 0.6 | 130 | 12 | 4.0 |
| Example 13 | Solution polymerization | 80 | 20 | 0 | MEK, 66 parts | (a) 0.1 | 0.8 | 130 | 12 | 4.0 |
| Example 14 | Solution polymerization | 70 | 30 | 0 | MEK, 66 parts | (a) 0.1 | 0.3 | 130 | 12 | 4.0 |
| Example 15 | Solution polymerization | 70 | 30 | 0 | MEK, 66 parts | (a) 0.1 | 0.6 | 130 | 12 | 4.0 |
| Example 16 | Solution polymerization | 70 | 30 | 0 | MEK, 66 parts | (a) 0.1 | 0.8 | 130 | 12 | 4.0 |
| Example 17 | Solution polymerization | 80 | 20 | 0 | MEK, 66 parts | (a) 0.1 | 0.3 | 130 | 12 | 4.0 |
| Example 18 | Solution polymerization | 80 | 20 | 0 | MEK, 66 parts | (a) 0.1 | 0.6 | 130 | 12 | 4.0 |
| Example 19 | Solution polymerization | 80 | 20 | 0 | MEK, 66 parts | (a) 0.1 | 0.8 | 130 | 12 | 4.0 |
| Comparative Example 1 | Suspension polymerization | 73 | 27 | 0 | MEK, 66 parts | (b) 0.3 | 0.8 | 65 | 800 | — |
| Comparative Example 2 | Bulk polymerization | 70 | 30 | 0 | — | (b) 0.5 | 0.8 | 85 | 12 | — |
| Comparative Example 3 | Solution polymerization | 44 | 18 | 38 | MEK, 10 parts | (a) 0.05 | 0.2 | 130 | 12 | 2.0 |
| Comparative Example 4 | Solution polymerization | 43 | 37 | 20 | EGME, 55 parts | (a) 0.05 | 0.1 | 110 | 20 | 4.0 |
| Comparative Example 5 | Solution polymerization | 43 | 37 | 20 | PM, 55 parts | (b) 0.05 | 0.1 | 90 | 10 | 4.0 |
| Comparative Example 6 | Solution polymerization | 70 | 30 | 0 | MEK, 50 parts | (a) 0.05 | 0.3 | 130 | 12 | 4.0 |
| Comparative Example 7 | Solution polymerization | 70 | 30 | 0 | MEK, 50 parts | (a) 0.05 | 0.3 | 130 | 12 | 4.0 |

TABLE 1-continued

| | | Copolymer solution (a) | | | Amounts of components of polymer (wt %) | | | Weight average molecular weight | Molecular weight distribution | Kind of copolymer solution (a) |
|---|---|---|---|---|---|---|---|---|---|---|
| | | Polymerization percentage (%) | Solid content (%) | Viscosity (Pa·s) | MMA units | MAA units | ST units | | | |
| | Example 1 | 60 | 60 | 60 | 70 | 30 | 0 | 110000 | 2.1 | a-1 |
| | Example 2 | 60 | 60 | 60 | 70 | 30 | 0 | 85000 | 2.1 | a-2 |
| | Example 3 | 60 | 60 | 60 | 70 | 30 | 0 | 68000 | 2.1 | a-3 |
| | Example 4 | 70 | 70 | 70 | 70 | 30 | 0 | 69000 | 2.1 | a-4 |
| | Example 5 | 60 | 60 | 40 | 78 | 22 | 0 | 62000 | 2.1 | a-5 |
| | Example 6 | 60 | 54 | 50 | 73 | 27 | 0 | 65000 | 2.1 | a-6 |
| | Example 7 | 60 | 54 | 50 | 73 | 27 | 0 | 65000 | 2.2 | a-7 |
| | Example 8 | 77 | 50 | 50 | 68 | 32 | 0 | 115000 | 2.2 | a-8 |
| | Example 9 | 77 | 50 | 40 | 68 | 32 | 0 | 84000 | 2.1 | a-9 |
| | Example 10 | 77 | 50 | 30 | 68 | 32 | 0 | 68000 | 2.2 | a-10 |
| | Example 11 | 77 | 50 | 20 | 78 | 22 | 0 | 112000 | 2.2 | a-11 |
| | Example 12 | 77 | 50 | 20 | 78 | 22 | 0 | 86000 | 2.2 | a-12 |
| | Example 13 | 77 | 50 | 20 | 79 | 21 | 0 | 65000 | 2.2 | a-13 |
| | Example 14 | 77 | 50 | 50 | 68 | 32 | 0 | 115000 | 2.2 | a-14 |
| | Example 15 | 77 | 50 | 40 | 68 | 32 | 0 | 84000 | 2.1 | a-15 |
| | Example 16 | 77 | 50 | 30 | 68 | 32 | 0 | 68000 | 2.2 | a-16 |
| | Example 17 | 77 | 50 | 20 | 78 | 22 | 0 | 112000 | 2.2 | a-17 |
| | Example 18 | 77 | 50 | 20 | 78 | 22 | 0 | 85000 | 2.2 | a-18 |
| | Example 19 | 77 | 50 | 20 | 79 | 21 | 0 | 65000 | 2.2 | a-19 |
| | Comparative Example 1 | 98 | — | — | 73 | 27 | 0 | 70000 | 2.1 | — |
| | Comparative Example 2 | | | Runaway polymerization | | | | | | — |
| | Comparative Example 3 | 63 | 41 | 52 | 44 | 18 | 38 | 130000 | 2.2 | a-20 |
| | Comparative Example 4 | 67 | 50 | 150 | 43 | 37 | 20 | 150000 | 2.1 | a-21 |
| | Comparative Example 5 | 67 | 50 | 150 | 43 | 37 | 20 | 150000 | 2.2 | a-22 |
| | Comparative Example 6 | 60 | 54 | 45 | 68 | 32 | 0 | 115000 | 2.2 | a-23 |
| | Comparative Example 7 | 60 | 54 | 45 | 68 | 32 | 0 | 115000 | 2.2 | a-24 |

MMA: Methyl methacrylate
MAA: Methacrylic acid
ST: Styrene
MEK: Methyl ethyl ketone
PM: Propylene glycol monomethyl ether
EGMA: Ethylene glycol monomethyl ether
*Radical initiator
(a) 1,1-bis-t-butyl peroxy cyclohexane
(b) Lauroyl peroxide

TABLE 2

| | Kind of copolymer solution (a) | Former devolatilization substep | | | | | Latter devolatilization substep | |
|---|---|---|---|---|---|---|---|---|
| | | Devolatilization apparatus | Temperature (°C.) | Retention time (min) | Pressure (Torr) | Volatile component content (wt %) | Devolatilization apparatus | Temperature (°C.) |
| Example 1 | a-1 | Double screw extruder | 150 | 15 | 20 | 6.5 | Nil (one devolatilization apparatus only) | |
| Example 2 | a-2 | | 150 | 15 | 20 | 6.6 | | |
| Example 3 | a-3 | | 150 | 15 | 20 | 6.7 | | |
| Example 4 | a-4 | | 150 | 15 | 20 | 7.5 | | |
| Example 5 | a-5 | | 150 | 15 | 20 | 7.7 | | |
| Example 6 | a-6 | | 150 | 15 | 20 | 7.7 | | |
| Example 7 | a-7 | | 150 | 15 | 20 | 7.8 | | |
| Example 8 | a-8 | | 150 | 15 | 20 | 7.6 | | |
| Example 9 | a-9 | | 150 | 15 | 20 | 7.8 | | |
| Example 10 | a-10 | | 150 | 15 | 20 | 6.5 | | |
| Example 11 | a-11 | | 150 | 15 | 20 | 6.8 | | |
| Example 12 | a-12 | | 150 | 15 | 20 | 6.6 | | |
| Example 13 | a-13 | | 150 | 15 | 20 | 6.6 | | |

TABLE 2-continued

| | | Devolatilization and cyclization steps | | | | | | |
|---|---|---|---|---|---|---|---|---|
| Example 14 | a-14 | | 150 | 5 | 760 | 6.5 | Double screw | 260 |
| Example 15 | a-15 | | 150 | 5 | 750 | 6.6 | extruder | 260 |
| Example 16 | a-16 | | 150 | 5 | 760 | 6.7 | | 260 |
| Example 17 | a-17 | | 150 | 5 | 760 | 7.5 | | 260 |
| Example 18 | a-18 | | 150 | 5 | 760 | 7.7 | | 260 |
| Example 19 | a-19 | | 150 | 5 | 760 | 7.7 | | 260 |
| Comparative Example 1 | — | — | — | — | — | — | — | — |
| Comparative Example 3 | a-20 | High temperature vacuum chamber | 250 | 60 | 50 | — | High temperature vacuum chamber | 250 |
| Comparative Example 4 | a-21 | Devolatilization tank | 260 | 30 | 20 | — | Devolatilization tank | 260 |
| Comparative Example 5 | a-22 | Devolatilization tank | 260 | 30 | 20 | — | Devolatilization tank | 260 |
| Comparative Example 6 | a-23 | High temperature vacuum chamber | 250 | 60 | 50 | — | High temperature vacuum chamber | 250 |
| Comparative Example 7 | a-24 | Devolatilization tank | 260 | 30 | 20 | — | Devolatilization tank | 260 |

| | Latter devolatilization substep | | | Cyclization step | | | Kind of |
|---|---|---|---|---|---|---|---|
| | Retention time (min) | Pressure (Torr) | Volatile component content (wt %) | Cyclization apparatus | Temperature (° C.) | Retention time (min) | Pressure (Torr) | thermoplastic polymer (B) |
| Example 1 | Nil (one devolatilization apparatus only) | | | Double screw stirring apparatus | 300 | 60 | 10 | B-1 |
| Example 2 | | | | | 300 | 60 | 10 | B-2 |
| Example 3 | | | | | 300 | 60 | 10 | B-3 |
| Example 4 | | | | | 300 | 60 | 10 | B-4 |
| Example 5 | | | | | 300 | 60 | 10 | B-5 |
| Example 6 | | | | | 300 | 60 | 10 | B-6 |
| Example 7 | | | | | 300 | 60 | 10 | B-7 |
| Example 8 | | | | | 300 | 60 | 10 | B-8 |
| Example 9 | | | | | 300 | 60 | 10 | B-9 |
| Example 10 | | | | | 300 | 60 | 10 | B-10 |
| Example 11 | | | | | 300 | 60 | 10 | B-11 |
| Example 12 | | | | | 300 | 60 | 10 | B-12 |
| Example 13 | | | | | 300 | 60 | 10 | B-13 |
| Example 14 | 5 | 20 | 3.2 | | 300 | 60 | 10 | B-14 |
| Example 15 | 5 | 20 | 3.1 | | 300 | 60 | 10 | B-15 |
| Example 16 | 5 | 20 | 3.3 | | 300 | 60 | 10 | B-16 |
| Example 17 | 5 | 20 | 4.3 | | 300 | 60 | 10 | B-17 |
| Example 18 | 5 | 20 | 4.2 | | 300 | 60 | 10 | B-18 |
| Example 19 | 5 | 20 | 4.1 | | 300 | 60 | 10 | B-19 |
| Comparative Example 1 | — | — | — | | 300 | 60 | 10 | B-20 |
| Comparative Example 3 | 60 | 50 | 5.5 | Devolatilization and cyclization steps simultaneously | | | | B-21 |
| Comparative Example 4 | 30 | 20 | 5.2 | Devolatilization and cyclization steps simultaneously | | | | B-22 |
| Comparative Example 5 | 30 | 20 | 5.1 | Devolatilization and cyclization steps simultaneously | | | | B-23 |
| Comparative Example 6 | 60 | 50 | 5.3 | Devolatilization and cyclization steps simultaneously | | | | B-24 |
| Comparative Example 7 | 30 | 20 | 5.2 | Devolatilization and cyclization steps simultaneously | | | | B-25 |

TABLE 3

| | | Evaluation results of thermoplastic copolymers | | | | | | |
|---|---|---|---|---|---|---|---|---|
| | Kind of thermoplastic polymer (B) | Amounts of components of thermoplastic copolymer (B) (wt %) | | | | Weight average molecular weight | Molecular weight distribution | Overall light transmittance (%) |
| | | (i) GAH units | (ii) MMA units | (iii) MAA units | (iv) ST units | | | |
| Example 1 | (B-1) | 32 | 64 | 4 | 0 | 110000 | 2.1 | 93 |
| Example 2 | (B-2) | 32 | 65 | 3 | 0 | 85000 | 2.2 | 82 |
| Example 3 | (B-3) | 32 | 64 | 4 | 0 | 69000 | 2.1 | 93 |
| Example 4 | (B-4) | 32 | 64 | 4 | 0 | 69000 | 2.2 | 93 |
| Example 5 | (B-5) | 24 | 74 | 2 | 0 | 68000 | 2.2 | 92 |

TABLE 3-continued

Evaluation results of thermoplastic copolymers

| | | | | | | | | |
|---|---|---|---|---|---|---|---|---|
| Example 6 | (B-6) | 33 | 63 | 4 | 0 | 67000 | 2.2 | 93 |
| Example 7 | (B-7) | 31 | 65 | 4 | 0 | 63000 | 2.1 | 93 |
| Example 8 | (B-8) | 32 | 64 | 4 | 0 | 115000 | 2.1 | 92 |
| Example 9 | (B-9) | 32 | 55 | 3 | 0 | 84000 | 2.1 | 93 |
| Example 10 | (B-10) | 32 | 65 | 3 | 0 | 66000 | 2.2 | 93 |
| Example 11 | (B-11) | 24 | 74 | 2 | 0 | 112000 | 2.2 | 92 |
| Example 12 | (B-12) | 24 | 74 | 2 | 0 | 85000 | 2.2 | 93 |
| Example 13 | (B-13) | 24 | 74 | 2 | 0 | 65000 | 2.1 | 93 |
| Example 14 | (B-14) | 32 | 65 | 3 | 0 | 115000 | 2.2 | 93 |
| Example 15 | (B-15) | 31 | 64 | 3 | 0 | 84000 | 2.2 | 92 |
| Example 16 | (B-16) | 33 | 64 | 3 | 0 | 68000 | 2.2 | 93 |
| Example 17 | (B-17) | 24 | 74 | 2 | 0 | 112000 | 2.2 | 93 |
| Example 18 | (B-18) | 24 | 74 | 2 | 0 | 85000 | 2.2 | 92 |
| Example 19 | (B-19) | 21 | 74 | 2 | 0 | 68000 | 2.2 | 93 |
| Comparative Example 1 | B-20 | 33 | 62 | 5 | 0 | 70000 | 2.5 | 89 |
| Comparative Example 3 | B-21 | 19 | 47 | 4 | 30 | 130000 | 2.2 | 91 |
| Comparative Example 4 | B-22 | 36 | 30 | 8 | 26 | 150000 | 2.2 | 92 |
| Comparative Example 5 | B-23 | 36 | 30 | 8 | 26 | 150000 | 2.2 | 92 |
| Comparative Example 6 | B-24 | 31 | 63 | 6 | 0 | 68000 | 2.2 | 91 |
| Comparative Example 7 | B-25 | 30 | 62 | 8 | 0 | 68000 | 2.2 | 91 |

| | Color tone (YI value) | Tg (° C.) | Number of foreign matter pieces (pieces/mm 2) | Volatile component content (wt %) | Amount of gas generation (wt %) | Melt viscosity (Pa · s) |
|---|---|---|---|---|---|---|
| Example 1 | 1.6 | 137 | 3.5 | 1.1 | 0.5 | 4200 |
| Example 2 | 1.5 | 138 | 3.1 | 1.2 | 0.6 | 3000 |
| Example 3 | 1.4 | 138 | 2.6 | 1.1 | 0.5 | 1200 |
| Example 4 | 1.2 | 138 | 3.2 | 1.1 | 0.5 | 1100 |
| Example 5 | 1.5 | 132 | 3.2 | 1.2 | 0.6 | 1200 |
| Example 6 | 1.5 | 136 | 3.3 | 1.2 | 0.6 | 1200 |
| Example 7 | 1.6 | 137 | 3.1 | 1.4 | 0.7 | 1200 |
| Example 8 | 1.5 | 138 | 3.1 | 1.2 | 0.5 | 4200 |
| Example 9 | 1.4 | 138 | 2.1 | 1.5 | 0.8 | 3000 |
| Example 10 | 1.2 | 138 | 1.7 | 1.2 | 0.6 | 1200 |
| Example 11 | 1.3 | 132 | 2.4 | 2.1 | 0.8 | 3200 |
| Example 12 | 1.7 | 132 | 3.3 | 0.8 | 0.4 | 2400 |
| Example 13 | 1.6 | 132 | 3.5 | 1.1 | 0.5 | 1100 |
| Example 14 | 1.2 | 138 | 1.7 | 1.2 | 0.5 | 4200 |
| Example 15 | 1.3 | 136 | 2.4 | 2.1 | 0.8 | 3000 |
| Example 16 | 1.7 | 138 | 3.3 | 0.8 | 0.4 | 1200 |
| Example 17 | 1.2 | 132 | 1.7 | 1.2 | 0.6 | 3200 |
| Example 18 | 1.3 | 132 | 2.4 | 2.1 | 0.8 | 2400 |
| Example 19 | 1.7 | 132 | 3.3 | 0.8 | 0.4 | 1100 |
| Comparative Example 1 | 2.2 | 138 | 32.5 | 2.5 | 1.5 | 2500 |
| Comparative Example 3 | 5.5 | 135 | 4.5 | 8.1 | 5.5 | 9800 |
| Comparative Example 4 | 6.2 | 140 | 4.6 | 8.6 | 6.2 | 11000 |
| Comparative Example 5 | 3.2 | 140 | 4.6 | 8.6 | 6.2 | 11000 |
| Comparative Example 6 | 4.4 | 138 | 4.6 | 7.2 | 5.3 | 1300 |
| Comparative Example 7 | 4.8 | 132 | 4.6 | 7.2 | 5.2 | 1300 |

MMA: Methyl methacrylate
MAA: Methacrylic acid
GAH: Glutaric anhydride
ST: Styrene Comparative Example 1

Polymerization Step: Suspension Polymerization Method

A stainless steel autoclave having a capacity of 20 liters and having baffles and Pfaudler stirring blades was supplied with a solution obtained by dissolving 2.5 g of a methyl methacrylate/acrylamide copolymer-based suspending agent (this was prepared according to the following method: a reactor was charged with 20 parts by weight of methyl methacrylate, 80 parts by weight of acrylamide, 0.3 part by weight of potassium persulfate and 1500 parts by weight of ion exchange water, and while the atmosphere in the reactor was replaced by nitrogen gas, the system was kept at 70° C.; the reaction was continued till the monomers were perfectly converted into a polymer, to obtain an aqueous solution of methyl acrylate/acrylamide copolymer; the obtained aqueous solution was used as the suspending agent), and the solution was stirred at 400 rpm, the atmosphere in the system being replaced by nitrogen gas. Then, 5000 g in total of the following monomer mixture was added while the reaction system was stirred, and the system was heated to 70° C. The moment when the internal temperature reached 70° C. was identified as the initiation of polymerization, and with this state kept for 180 minutes, the polymerization was terminated. Thereafter, the cooling of the reaction system and the separation, washing and drying of the polymer were performed according to ordinary methods, to obtain a copolymer (A) as beads. The polymerization percentage of the copolymer (A) was 98%, and the weight average molecular weight was 70000.

| | |
|---|---|
| Methacrylic acid | 27 parts by weight |
| Methyl methacrylate | 73 parts by weight |
| n-dodecyl mercaptan | 0.8 part by weight |
| Lauryl peroxide | 0.3 part by weight |

Cyclization Step

The beads of the copolymer (A) obtained in the aforementioned polymerization step were continuously supplied into a 44 mm φ double screw extruder having spectacle-shaped blades (produced by Hitachi, Ltd., L/D=28.0, three vents) at a supply rate of 10.0 kg/h, and cyclization reaction was performed at a screw speed of 50 rpm and a cylinder temperature of 300 °C with the pressure reduced to 20 Torr via the vents. A strand cutter was used for pelletization, to produce a thermoplastic copolymer (B-20). The average retention time in the cyclization apparatus in this case was 60 minutes.

The pellets of the obtained (B-20) were dried at 100° C. for 8 hours, and determined by $^1$H-NMR. The amounts of the respective components of the copolymer and the evaluation results of respective properties are shown in Table 3.

Comparative Example 2

Polymerization Step: Bulk Polymerization Method

A stainless steel autoclave having a capacity of 20 liters and double helical stirring blades was supplied with 10 kg in total of the following monomer mixture using a plunger pump, and with stirring at 50 rpm, the atmosphere in the system was bubbled with 10 L/min of nitrogen gas for 15 minutes. Then, while nitrogen gas was allowed to flow at a flow rate of 5 L/min and while the reaction system was stirred, the reaction system was heated to 100° C. to initiate polymerization. At the time point of 160 minutes after the initiation of polymerization, runaway polymerization occurred to stop stirring, and it was difficult to continue the polymerization.

| | |
|---|---|
| Methacrylic acid | 25 parts by weight |
| Methyl methacrylate | 75 parts by weight |
| Lauroyl peroxide | 1.2 parts by weight |
| n-dodecyl mercaptan | 0.8 part by weight |

Comparative Example 3

Polymerization Step: Continuous Solution Polymerization Method

A copolymer solution (a) was obtained according to the production method disclosed in Example 8 of Patent Document 3. Further, the copolymer solution (a) was sampled from the outlet of the polymerization vessel and analyzed. The properties of the obtained copolymer solution (a) and the copolymer (A) are shown in Table 1.

Devolatilization and Cyclization Step

According to the method disclosed in Example 8 of Patent Document 3, the copolymer solution (a) obtained in the polymerization step was continuously supplied into a high temperature vacuum chamber heated to 250° C., and devolatilization and cyclization reaction were performed at a pressure of 50 Torr for 60 minutes to obtain a lumpy products. The lumpy product was ground to obtain a thermoplastic copolymer (B-21). The powder of the obtained (B-21) was dried at 100 °C for 8 hours, and determined by $^1$H-NMR. The amounts of the respective components of the copolymer and the evaluation results of respective properties are shown in Table 3.

Comparative Example 4

Polymerization Step: Continuous Solution Polymerization Method

A copolymer solution (a) was obtained according to the production method disclosed in Example 2 of Patent Document 4. Further, the copolymer solution (a) was sampled from the outlet of the polymerization vessel and analyzed. The properties of the obtained copolymer solution (a) and copolymer (A) are shown in Table 1.

Devolatilization and Cyclization Step

According to the method disclosed in Example 2 of Patent Document 4, the copolymer solution (a) obtained in the polymerization step was continuously supplied into a devolatilization tank heated to 260° C. and devolatilization and cyclization reaction were performed at a pressure of 20 Torr for 30 minutes, to obtain a thermoplastic copolymer (B-22) as pellets. The powder of the obtained (B-22) was dried at 100° C. for 8 hours and determined by $^1$H-NMR. The amounts of the respective components of the copolymer and the evaluation results of respective properties are shown in Table 3.

Comparative Example 5

Polymerization Step: Continuous Solution Polymerization Method

A copolymer solution (a) was obtained according to the production method disclosed in Example 2 of Patent Document 4. Further, the copolymer solution (a) was sampled from the outlet of the polymerization vessel and analyzed. The properties of the obtained polymer solution (a) and copolymer (A) are shown in Table 1.

Devolatilization and Cyclization Step

According to the method disclosed in Example 2 of Patent Document 4, the copolymer solution (a) obtained in the polymerization step was supplied into a devolatilization tank heated to 260° C., and devolatilization and cyclization reaction were performed at a pressure of 20 Torr for 30 minutes, to obtain a thermoplastic copolymer (B-23) as pellets. The powder of the obtained (B-23) was dried at 100° C. for 8 hours and determined by $^1$H-NMR. The amounts of the respective components of the copolymer and the evaluation results of respective properties are shown in Table 3.

Comparative Example 6

Polymerization Step

Continuous polymerization was performed under the same conditions as in Example 8, to produce a copolymer solution (a). The obtained copolymer solution (a) was sampled and analyzed. As a result, the polymerization percentage was 80% and the content, namely, the solid content of the copolymer (A) in the copolymer solution (a) was 40 wt %. Further, the viscosity of the obtained copolymer solution (a) was measured at 30 □C and found to be 30 Pa·s.

Cyclization Step

The copolymer solution (a) obtained in the polymerization step was continuously supplied into a high temperature vacuum chamber heated to 250° C. based on the method disclosed in Patent Document 2, and devolatilization and cyclization reaction were performed at a pressure of 50 Torr for 60 minutes, to obtain a lumpy product. The lumpy product was ground to obtain a thermoplastic copolymer (B-24). The powder of the obtained (B-24) was dried at 100° C. for 8 hours and determined by $^1$H-NM. The amounts of the respective components of the copolymer and the evaluation results of respective properties are shown in Table 3.

Comparative Example 7

Polymerization Step

Continuous polymerization was performed under the same conditions as in Example 8, to produce a copolymer solution (a). The obtained copolymer solution (a) was sampled and analyzed. As a result, the polymerization percentage was 80% and the content, namely, the solid content of the copolymer (A) in the copolymer solution (a) was 40 wt %. Further, the viscosity of the obtained copolymer solution (a) was measured at 30° C. and found to be 30 Pa·s.

Cyclization Step

The copolymer solution (a) obtained in the polymerization step was supplied into a devolatilization tank heated to 260° C. based on the method disclosed in Patent Document 3, and devolatilization and cyclization reaction were performed at a pressure of 20 Torr for 30 minutes, to obtain a thermoplastic copolymer (B-25) as pellets. The powder of the obtained (B-25) was dried at 100° C. for 8 hours and determined by $^1$H-NMR. The amounts of the respective components of the copolymer and the evaluation results of respective properties are shown in Table 3.

From Examples 1 to 19 and Comparative Examples 1 to 7, it can be seen that according to the production process of this invention, bulk polymerization or solution polymerization is performed under specific polymerization conditions in the polymerization step, followed by the devolatilization of removing the unreactive monomers from the obtained polymerization solution and further by the cyclization reaction performed under specific conditions, and therefore that a thermoplastic copolymer (B) small in the amount of gas generation during retention and having high heat resistance, thermal stability, excellent colorless transparency, and above all little foreign matter can be produced.

On the other hand, it can be seen that if polymerization is performed by processes not in conformity with this invention, the thermoplastic copolymers obtained after heat treatment under any other conditions are inferior in color tone and in the number of foreign matter pieces.

Example 20

Production Example Using a Tubular Reactor

Former Polymerization Substep

A stainless steel autoclave having a capacity of 20 liters and double helical stirring blades was continuously supplied with the following monomer mixture bubbled with 20 L/min of nitrogen gas for 15 minutes at a rate of 8.0 kg/h, and the system was stirred at 50 rpm with the internal temperature controlled at 130° C. for an average retention time of 5 hours, for being continuously polymerized. The polymerization percentage was 40% and the viscosity of the copolymer solution (a) was measured at 30° C. and found to be 30 Pa·s.

| | |
|---|---|
| Methacrylic acid | 30 parts by weight |
| Methyl methacrylate | 70 parts by weight |
| Methyl ethyl ketone | 66 parts by weight |
| 1,1-di-t-butyl peroxy cyclohexane | 0.01 part by weight |
| n-dodecyl mercaptan | 0.6 parts by weight |

Latter Polymerization Substep

In succession, the copolymer solution (a) obtained in the former polymerization substep was continuously drawn and preliminarily mixed with further added 0.005 part by weight of 1,1-di-t-butyl peroxy cyclohexane using a gear pump in a pipe portion internally equipped with a tubular reactor with an inner diameter of 2.5 inches (SMX static mixer containing 30 static mixing elements produced by Gebrueder Sulzer, Switzerland), then being continuously supplied into another tubular reactor with an inner diameter of 2.5 inches (SMX static mixer containing 30 static mixing elements produced by Gebrueder Sulzer, Switzerland) installed in series, to perform polymerization reaction. The inner wall temperature of the tubular reactors in this case was 130° C., and the half life of the radical polymerization initiator at the inner wall temperature was 12 minutes. Further, the average retention time in the tubular reactors was 60 minutes. Furthermore, the internal pressure was 25 kg/cm$^2$G. The copolymer solution (a) obtained in the latter polymerization substep was analyzed. As a result, the polymerization percentage was 80% and the viscosity of the copolymer solution (a) at 30° C. was 70 Pa·s. Moreover, 10 g of the copolymer solution (a) was dissolved into 40 g of tetrahydrofuran, and the solution was re-precipitated in 500 mL of hexane, to obtain 4.0 of a copolymer (A-26) as a powder. From it, the polymer content (solid content) was calculated and found to be 80 wt %. The weight average molecular weight of the copolymer (A-26) was 85000 and the amount of methacrylic acid units in the copolymer (A) was 30 wt %.

Devolatilization Step

In succession, the copolymer solution (a) obtained in the abovementioned polymerization step was continuously supplied into a 44 mm φ double screw extruder (TEX 44 (produced by The Japan Steel Works, Ltd., L/D=45.0, one back vent, three fore vents) at a supply rate of 8.0 kg/h using a gear pump, and devolatilization treatment was performed at a screw speed of 75 rpm and a cylinder temperature of 150° C. with the pressure reduced to 20 Torr via the vents. At this moment, the devolatilized copolymer (A) was sampled, and the contained volatile component was measured.

Cyclization Step

In succession, the copolymer (A) obtained in the devolatilization step was continuously supplied into a spectacle-shaped blade horizontal double screw stirrer ("Hitachi Spectacle-shaped Blade Polymerizer (trade name)" produced by Hitachi, Ltd., capacity 24 L, one vent) at a supply rate of 3.8 kg/h, and cyclization reaction was performed at a screw speed of 10 rpm and a cylinder temperature of 300° C., with the pressure reduced to 10 Torr via the vent. A strand cutter was used for pelletization, to produce a thermoplastic copolymer (B-26) at a rate of 3.6 kg/h. The average retention time in the cyclization apparatus in this case was 60 minutes.

The pellets of the obtained (B-26) were dried at 100□C for 8 hours, and determined by $^1$H-NMR. The amounts of the respective components of the copolymer and the evaluation results of respective properties are shown in Table 4.

Volatile Component Recovery Step: Recovery of Unreactive Monomers and Organic Solvent (C)

The vents of the double screw extruder of the abovementioned devolatilization step were connected with a condenser, and the volatile component was recovered at 4.2 kg/h. In succession, the recovered solution was supplied to a distillation column and distilled under reduced pressure at 90° C. and 400 Torr, to be continuously refined, 97% being recovered as raw materials. The recovered raw materials were recycled as a raw material mixture into the polymerization step.

Example 21

Production Example Using a Tubular Reactor

Former Polymerization Substep

A stainless steel autoclave having a capacity of 20 liters and double helical stirring blades was continuously supplied with the following monomer mixture bubbled with 20 L/min of nitrogen gas for 15 minutes at a rate of 5 kg/h, and the system was stirred at 50 rpm with the internal temperature controlled at 130° C. for an average retention time of 5 hours, for being continuously polymerized. The polymerization percentage was 40% and the viscosity of the copolymer solution (a) was measured at 30° C. and found to be 20 Pa·s.

| | |
|---|---|
| Methacrylic acid | 20 parts by weight |
| Methyl methacrylate | 80 parts by weight |
| Methyl ethyl ketone | 66 parts by weight |
| 1,1-di-t-butyl peroxy cyclohexane | 0.01 part by weight |
| n-dodecyl mercaptan | 0.6 parts by weight |

Latter Polymerization Substep

In succession, the copolymer solution (a) obtained in the former polymerization substep was continuously drawn and preliminarily mixed with further added 0.005 part by weight of 1,1-di-t-butyl peroxy cyclohexane using a gear pump in a pipe portion internally equipped with a tubular reactor with an inner diameter of 2.5 inches (SMX static mixer containing 30 static mixing elements produced by Gebrueder Sulzer, Switzerland), then being continuously supplied into another tubular reactor with an inner diameter of 2.5 inches (SMX static mixer containing 30 static mixing elements produced by Gebrueder Sulzer, Switzerland) installed in series, to perform polymerization reaction. The inner wall temperature of the tubular reactors in this case was 130° C., and the half life of the radical polymerization initiator at the inner wall temperature was 12 minutes. Further, the average retention time in the tubular reactors was 60 minutes. Furthermore, the internal pressure was 25 kg/cm$^2$G. The copolymer solution (a) obtained in the latter polymerization substep was analyzed. As a result, the polymerization percentage was 80% and the viscosity of the copolymer solution (a) at 30° C. was 50 Pa·s. Moreover, 10 g of the copolymer solution (a) was dissolved into 40 g of tetrahydrofuran, and the solution was re-precipitated in 500 mL of hexane, to obtain 4.0 of a copolymer (A-27) as a powder. From it, the polymer content (solid content) was calculated and found to be 80 wt %. The weight average molecular weight of the copolymer (A-27) was 85000 and the amount of methacrylic acid units in the copolymer (A) was 20 wt %.

Devolatilization Step

In succession, the copolymer solution (a) obtained in the abovementioned polymerization step was continuously supplied nto a 44 mm □ double screw extruder (TEX 44 (produced by The Japan Steel Works, Ltd., L/D=45.0, one back vent, three fore vents) at a supply rate of 8.0 kg/h using a gear pump, and devolatilization treatment was performed at a screw speed of 75 rpm and a cylinder temperature of 150 □C with the pressure reduced to 20 Torr via the vents. At this moment, the devolatilized copolymer (A) was sampled, and the contained volatile component was measured.

Cyclization Step

In succession, the copolymer (A) obtained in the devolatilization step was continuously supplied into a spectacle-shaped blade horizontal double screw stirrer ("Hitachi Spectacle-shaped Blade Polymerizer (trade name)" produced by Hitachi, Ltd., capacity 24 L, one vent) at a supply rate of 3.8 kg/h, and cyclization reaction was performed at a screw speed of 10 rpm and a cylinder temperature of 300 □C, with the pressure reduced to 10 Torr via the vent. A strand cutter was used for pelletization, to produce a thermoplastic copolymer (B-27) at a rate of 3.6 kg/h. The average retention time in the cyclization apparatus in this case was 60 minutes.

The pellets of the obtained (27) were dried at 10 □C for 8 hours, and determined by $^1$H-NMR. The amounts of the respective components of the copolymer and the evaluation results of respective properties are shown in Table 4.

Volatile Component Recovery Step: Recovery of Unreactive Monomers and Organic Solvent (C)

The vents of the double screw extruder of the abovementioned devolatilization step were connected with a condenser, and the volatile component was recovered at 4.2 kg/h. In succession, the recovered solution was supplied to a distillation column and distilled under reduced pressure at 90 □C and 400 Torr, to be continuously refined, 97% being recovered as raw materials. The recovered raw materials were recycled as a raw material mixture into the polymerization step.

TABLE 4

| | Kind of thermoplastic polymer (B) | Amounts of components of thermoplastic copolymer (B) (wt %) | | | Weight average molecular weight | Molecular weight distribution | Overall light transmittance (%) |
|---|---|---|---|---|---|---|---|
| | | (i) GAH units | (ii) MMA units | (iii) MAA units | | | |
| Example 20 | (B-26) | 31 | 65 | 4 | 85000 | 2.1 | 93 |
| Example 21 | (B-27) | 24 | 74 | 2 | 85000 | 2.1 | 92 |

| | Color tone (YI value) | Tg (° C.) | Number of foreign matter pieces (pieces/mm 2) | Volatile component content (wt %) | Amount of gas generation (wt %) | Melt viscosity (Pa · s) |
|---|---|---|---|---|---|---|
| Example 20 | 1.6 | 137 | 3.1 | 1.4 | 0.7 | 3000 |
| Example 21 | 1.5 | 138 | 3.1 | 1.2 | 0.6 | 2400 |

MMA: Methyl methacrylate
MAA: Methacrylic acid
GAH: Glutaric anhydride

Examples 22 to 43 and Comparative Examples 8 to 13

Production of Thermoplastic Resin Compositions (1) Reference Example

Production of Rubber-Containing Polymer (D)

A glass vessel (capacity 5 liters) with a condenser was charged with 120 parts by weight of deionized water, 0.5 part by weight of potassium carbonate, 0.5 part by weight of dioctyl sulfosuccinate and 0.005 part by weight of potassium persulfate, and after stirring in nitrogen atmosphere, 53 parts by weight of butyl acrylate, 17 parts by weight of styrene and 1 part by weight of allyl methacrylate (crosslinking agent) were supplied. The mixture was made to react at 70° C. for 30 minutes, to obtain a core layer polymer. Then, a mixture consisting of 21 parts by weight of methyl methacrylate, 9 parts by weight of methacrylic acid and 0.005 part by weight of potassium persulfate was continuously added, taking 90 minutes, and the mixture was held for further 90 minutes, to polymerize a shell layer. This polymer latex was solidified by sulfuric acid, neutralized with caustic soda, washed and filtered. The residue was dried to obtain a rubber-containing polymer (D) with a two-layer structure. The number average particle size of the polymer particles measured using an electron microscope was 155 nm.

(2) Examples 22 to 43 and Comparative Examples 8 to 13

Production of Thermoplastic Resin Compositions

The thermoplastic copolymers (B) obtained in the above-mentioned Examples 1 through 21 and Comparative Examples 1 and 3 through 7 and the rubbery polymer (D) obtained in Reference Example were mixed at the rates shown in Table 5. Each of the mixtures was kneaded using a double screw extruder (TEX30 (produced by the Japan Steel Works, Ltd., L/D=44.5) at a cylinder temperature of 280° C. and a screw speed of 100 rpm, to obtain a thermoplastic resin composition as pellets. Then, the thermoplastic resin composition obtained as pellets was molded into respective specimens using an injection molding machine (SG75H-MIV produced by Sumitomo Heavy Industries, Ltd.) under the following molding conditions: molding temperature . . . (the glass transition temperature of the thermoplastic polymer (B)+150)° C., mold temperature . . . 80° C., injection time . . . 5 seconds, cooling time . . . 10 seconds, molding pressure . . . pressure for filling the mold with the entire resin (lower limit pressure of molding)+1 MPa.

The evaluation results of the obtained thermoplastic resin compositions are shown in Table 5.

TABLE 5

| | Thermoplastic polymer (B) | | Rubbery polymer (D), parts by weight | Properties of resin composition | | | | | | |
|---|---|---|---|---|---|---|---|---|---|---|
| | Kind | Parts by weight | | Glass transition temperature (° C.) | Overall light transmittance (%) | Haze (%) | Color tone (YI) | Izod impact value (J/m) | Tensile elongation at break (%) | Heating loss (wt %) |
| Example 22 | (B-1) | 80 | 20 | 135 | 92 | 2.5 | 3.2 | 85 | 28 | 0.6 |
| Example 23 | (B-2) | 80 | 20 | 135 | 93 | 2.3 | 3.4 | 84 | 26 | 0.5 |
| Example 24 | (B-3) | 80 | 20 | 135 | 92 | 2.3 | 3.4 | 83 | 24 | 0.5 |
| Example 25 | (B-4) | 80 | 20 | 134 | 92 | 2.3 | 3.4 | 84 | 24 | 0.5 |
| Example 26 | (B-5) | 80 | 20 | 129 | 92 | 2.3 | 2.6 | 84 | 26 | 0.5 |
| Example 27 | (B-6) | 80 | 20 | 133 | 93 | 2.3 | 3.3 | 84 | 26 | 0.5 |
| Example 28 | (B-7) | 80 | 20 | 132 | 92 | 2.3 | 3.3 | 83 | 26 | 0.5 |
| Example 29 | (B-8) | 80 | 20 | 135 | 92 | 2.6 | 3.5 | 84 | 28 | 0.5 |
| Example 30 | (B-9) | 80 | 20 | 135 | 92 | 2.6 | 3.5 | 84 | 26 | 0.5 |
| Example 31 | (B-10) | 80 | 20 | 134 | 92 | 2.3 | 2.9 | 82 | 24 | 0.5 |
| Example 32 | (B-11) | 80 | 20 | 130 | 92 | 2.3 | 2.5 | 82 | 28 | 0.5 |

TABLE 5-continued

| | Thermoplastic polymer (B) | | Rubbery polymer (D), parts by weight | Properties of resin composition | | | | | | |
|---|---|---|---|---|---|---|---|---|---|---|
| | | | | Glass transition temperature (° C.) | Overall light transmittance (%) | Haze (%) | Color tone (YI) | Izod impact value (J/m) | Tensile elongation at break (%) | Heating loss (wt %) |
| | Kind | Parts by weight | | | | | | | | |
| Example 33 | (B-12) | 80 | 20 | 129 | 92 | 2.3 | 2.5 | 83 | 26 | 0.5 |
| Example 34 | (B-13) | 80 | 20 | 129 | 92 | 2.6 | 2.5 | 84 | 24 | 0.5 |
| Example 35 | (B-14) | 80 | 20 | 135 | 92 | 2.6 | 3.5 | 84 | 28 | 0.5 |
| Example 37 | (B-15) | 80 | 20 | 135 | 92 | 2.3 | 2.9 | 82 | 26 | 0.5 |
| Example 38 | (B-16) | 80 | 20 | 134 | 92 | 2.3 | 2.9 | 82 | 24 | 0.5 |
| Example 39 | (B-17) | 80 | 20 | 130 | 92 | 2.3 | 2.5 | 83 | 28 | 0.5 |
| Example 40 | (B-18) | 80 | 20 | 129 | 92 | 2.6 | 2.5 | 84 | 26 | 0.5 |
| Example 41 | (B-19) | 80 | 20 | 129 | 92 | 2.6 | 2.5 | 84 | 24 | 0.5 |
| Example 42 | (B-26) | 80 | 20 | 135 | 92 | 2.6 | 3.5 | 84 | 26 | 0.5 |
| Example 43 | (B-27) | 80 | 20 | 129 | 92 | 2.3 | 2.4 | 82 | 26 | 0.5 |
| Comparative Example 8 | B-20 | 80 | 20 | 135 | 92 | 2.3 | 3.2 | 84 | 25 | 1.5 |
| Comparative Example 9 | B-21 | 80 | 20 | 133 | 87 | 8.2 | 9.3 | 70 | 18 | 5.5 |
| Comparative Example 10 | B-22 | 80 | 20 | 136 | 88 | 6.2 | 8.2 | 72 | 18 | 6.2 |
| Comparative Example 11 | B-23 | 80 | 20 | 136 | 92 | 3.8 | 3.8 | 78 | 21 | 6.2 |
| Comparative Example 12 | B-24 | 80 | 20 | 135 | 91 | 3.8 | 3.8 | 78 | 21 | 5.3 |
| Comparative Example 13 | B-25 | 80 | 20 | 129 | 92 | 3.7 | 3.7 | 78 | 21 | 5.2 |

In the comparison between Examples 22 to 43 and Comparative Examples 8 to 13, it can be seen that since the thermoplastic resin compositions of this invention contain the thermoplastic copolymers (B) obtained in Examples 1 to 21, the weight loss during heat retention could be inhibited to show excellent thermal stability. That is, it can be seen that the thermoplastic resin compositions of this invention are excellent in high transparency, heat resistance and toughness, especially very excellent in thermal stability and color tone. On the other hand, it can be seen that the thermoplastic resin compositions not in conformity with this invention are inferior in color tone and heating loss.

INDUSTRIAL APPLICABILITY

This invention is a process for industrially producing a copolymer containing glutaric anhydride units excellent in transparency and thermal stability, and the copolymer obtained by this process can be used for optical materials such as optical lenses, prisms, mirrors, optical discs, optical fibers, liquid crystal display sheets/films, light guide plates, etc.

The invention claimed is:

1. A process for producing a thermoplastic copolymer, in which a copolymer (A) containing (i) unsaturated carboxylic acid alkyl ester units and (ii) unsaturated carboxylic acid units is produced and in succession heat-treated to undergo an intramolecular cyclization reaction through a dehydration and/or dealcoholization reaction, wherein a thermoplastic copolymer (B) containing (iii) glutaric anhydride units, each represented by the following general formula (1), and the (i) unsaturated carboxylic acid alkyl ester units is produced, said process comprising:

supplying into a polymerization vessel a monomer mixture containing an unsaturated carboxylic acid alkyl ester monomer and an unsaturated carboxylic acid monomer as raw materials, a raw material mixture solution containing 0.1 to 2.0 parts by weight of a chain transfer agent per 100 parts by weight of the monomer mixture, and a radical polymerization initiator with a half life of 0.01 to 60 minutes at the polymerization temperature in a polymerization step, and performing continuous polymerization while the content of the copolymer (A) in the polymerization vessel is kept at 20 to 80 wt %, to continuously produce a copolymer solution (a) consisting of the copolymer (A) and an unreactive monomer mixture, whereby in succession, the copolymer solution (a) obtained in the polymerization step is continuously supplied into a devolatilization apparatus and subjected to devolatilization in a range from the polymerization temperature to lower than 300° C. at a reduced pressure of 200 Torr or less to separate and remove the unreactive monomers in a devolatilization step, and the copolymer (A) obtained in said devolatilization step is continuously supplied into a cyclization apparatus to be heat-treated in the cyclization apparatus at a temperature of 200° C. to 350° C. so as to conduct an intramolecular cyclization reaction in a cyclization step to produce thermoplastic copolymer (B),

[Chemical formula 1]

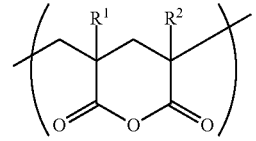

wherein $R^1$ and $R^2$ denote, respectively independently, any one selected from a hydrogen atom and alkyl groups with 1 to 5 carbon atoms.

2. A process for producing a thermoplastic copolymer, according to claim 1, wherein an organic solvent (C) capable of dissolving the copolymer (A) is contained in the raw material mixture at 1 to 200 parts by weight per 100 parts by weight of the monomer mixture in said polymerization step.

3. A process for producing a thermoplastic copolymer, according to claim 1, wherein the polymerization vessel in said polymerization step is a mixing reactor leer complete mixing.

4. A process for producing a thermoplastic copolymer, wherein the polymerization vessel in said polymerization step is a mixing reactor for complete mixing in the form of a tubular reactor with statically mixing structure portions disposed successively in series and wherein continuous polymerization is performed in said tubular reactor with the content of the copolymer (A) kept at 20 to 55 wt %, to continuously produce the copolymer solution (a);

whereby in succession, the obtained copolymer solution (a) is continuously drawn by a pump and red under pressurization to the tubular reactor with statically mixing structure portions; and also in succession a radical polymerization initiator is added to the tubular reactor and mixed while the reaction solution is passed through, to produce the copolymer solution (a) while ensuring that the content of the copolymer (A) in the copolymer solution (a) is kept at 50 to 90 wt % at the outlet of the tubular reactor.

5. A process for producing a thermoplastic copolymer, according to claim 1, wherein the devolatilization apparatus in said devolatilization step is an apparatus that has a cylindrical container and a stirrer with numerous stirring elements installed around a single or multiple rotating shafts, and has at least one or more vent holes at the top of the cylindrical portion, a supply port for supplying the copolymer solution (a) at one end of the cylindrical portion and a discharge port for discharging the copolymer (A) after completion of devolatilization at the other end.

6. A process for producing a thermoplastic copolymer, according to claim 5, wherein the devolatilization apparatus in said devolatilization step is a vented double screw extruder.

7. A process for producing a thermoplastic copolymer, according to claim 1, wherein said devolatilization step comprises a preliminary devolatilization substep for performing devolatilization in a devolatilization apparatus heated to a range from the polymerization temperature to 250° C. and reduced in pressure to 200 Torr or lower, and a subsequent devolatilization substep for performing devolatilization in a devolatilization apparatus heated to a range from the devolatilization temperature of said preliminary devolatilization substep to 300° C. and reduced in pressure to 200 Torr or lower.

8. A process for producing a thermoplastic copolymer, according to claim 1, wherein the cyclization apparatus in said cyclization step is a horizontal stirring apparatus that has a cylindrical container and a stirrer with multiple stirring elements installed around a rotating shaft, has at least one vent hole at the top of the cylindrical portion, a supply port for supplying the copolymer (A) at one end of the cylindrical portion and has a discharge port for discharging the thermoplastic copolymer (B) at the other end, and wherein the cyclization reaction is conducted at a temperature of 250° C. to 350° C. and a pressure of 100 Torr or lower while the reaction mixture is retained for 20 to 180 minutes.

9. A process for producing a thermoplastic copolymer, according to claim 1, wherein the unreactive monomers or the mixture consisting of the unreactive monomers and the organic solvent (C) that are separated and removed in the devolatilization step are recycled into said polymerization step.

10. A process for producing a thermoplastic copolymer, according to claim 1, wherein a recovered solution obtained by recovering the unreactive monomers or the mixture consisting of the unreactive monomers and the organic solvent (C) that are separated and removed in said devolatilization step is subjected to a volatile component recovery step to separate and refine raw materials that are recovered before being recycled into the polymerization step.

11. A process for producing a thermoplastic copolymer, according to claim 1, wherein the added amount of the chain transfer agent is 0.5 to 1.5 parts by weight per 100 parts by weight of the monomer mixture in said polymerization step.

12. A process for producing a thermoplastic copolymer, according to claim 1, wherein the added amount of the radical polymerization initiator is 0.001 to 2.0 parts by weight per 100 parts by weight of the monomer mixture in said polymerization step.

13. A process for producing a thermoplastic copolymer, according to claim 11, wherein the weight average molecular weight of said thermoplastic copolymer is 30000 to 150000.

14. A process for producing a thermoplastic copolymer, according to claim 1, wherein the monomer mixture in said polymerization step consists of 15 to 50 wt % of an unsaturated carboxylic acid, 50 to 85 wt % of an unsaturated carboxylic acid alkyl ester and 0 to 10 wt % of another copolymerizable monomer component based on a total monomer mixture weight of 100 wt %.

15. A process for producing a thermoplastic copolymer, according to claim 14, wherein said thermoplastic copolymer (B) contains 5 to 50 wt % of (iii) glutaric anhydride units.

16. A process for producing a thermoplastic resin composition which comprises mixing a rubber-containing polymer (D) with the thermoplastic copolymer (B) obtained by the process of claim 1.

17. A process for producing a thermoplastic resin composition, according to claim 16, wherein the rubber-containing polymer (D) is a multilayer structure polymer having one or more rubber layers inside.

18. A process for producing a thermoplastic resin composition, according to claim 17, wherein the number average particle size of the multilayer structure polymer is 0.05 to 1 µm.

19. A process for producing a thermoplastic resin composition, according to claim 17, wherein the polymer constituting the outermost shell layer of the multilayer structure polymer contains glutaric anhydride-containing units, each represented by said general formula (1).

20. A process for producing a thermoplastic resin composition, according to claim 17, wherein the polymer constituting the rubbery layer of the multilayer structure polymer contains acrylic acid alkyl ester units and aromatic vinyl units.

21. A process for producing a thermoplastic copolymer, in which a copolymer (A) containing (i) unsaturated carboxylic acid alkyl ester units and (ii) unsaturated carboxylic acid units is produced and in succession heat-treated to undergo an intramolecular cyclization reaction through a dehydration and/or dealcoholization reaction, wherein a thermoplastic copolymer (B) containing (iii) glutaric anhydride units, each represented by the following general formula (1), and the (i) unsaturated carboxylic acid alkyl ester units is produced, said process comprising:

supplying into a polymerization vessel, in the absence of water, a monomer mixture containing an unsaturated carboxylic acid alkyl ester monomer and an unsaturated carboxylic acid monomer as raw material's, a raw material mixture solution containing 0.1 to 2.0 parts by weight of a chain transfer agent per 100 parts by weight of the monomer mixture, and a radical polymerization initiator with a half life of 0.01 to 60 minutes at the polymerization temperature in a polymerization step, and performing continuous polymerization while the content of the copolymer (A) in the polymerization vessel is kept at 20 to 80 wt %, to continuously produce a copolymer solution (a) consisting of the copolymer (A) and an unreactive monomer mixture, whereby in succession, the copolymer solution (a) obtained in the polymerization step is continuously supplied into a devolatilization apparatus and subjected to devolatilization in a range from the polymerization temperature to lower than 300° C. at a reduced pressure of 200 Torr or less to separate and remove the unreactive monomers in a devolatilization step, and the copolymer (A) obtained in said devolatilization step is continuously supplied into a cyclization apparatus to be heat-treated in the cyclization apparatus at a temperature of 200° C. to 350° C. so as to conduct an intramolecular cyclization reaction in a cyclization step to produce thermoplastic copolymer (B),

[Chemical formula 1]

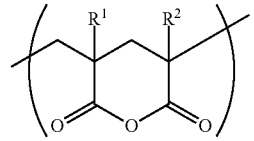

wherein $R^1$ and $R^2$ denote, respectively independently, any one selected from a hydrogen atom and alkyl groups with 1 to 5 carbon atoms.

* * * * *